(12) United States Patent
Goetz et al.

(10) Patent No.: US 9,181,482 B2
(45) Date of Patent: *Nov. 10, 2015

(54) LIQUID-CRYSTAL DISPLAY

(71) Applicant: MERCK PATENT GmbH, Darmt (DE)

(72) Inventors: Achim Goetz, Alsbach-Haehnlein (DE); Erdal Durmaz, Darmstadt (DE); Malgorzata Rillich, Darmstadt (DE); Andreas Taugerbeck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,346

(22) Filed: Dec. 17, 2013

(65) Prior Publication Data

US 2014/0104544 A1    Apr. 17, 2014

Related U.S. Application Data

(62) Division of application No. 12/934,278, filed as application No. PCT/EP2009/001514 on Mar. 4, 2009, now Pat. No. 8,697,200.

(30) Foreign Application Priority Data

Mar. 25, 2008    (DE) .......................... 10 2008 015 481

(51) Int. Cl.
    *C09K 19/32*    (2006.01)
    *G02F 1/1334*    (2006.01)
    *C09K 19/04*    (2006.01)
    *C09K 19/54*    (2006.01)

(52) U.S. Cl.
    CPC .............. *C09K 19/32* (2013.01); *G02F 1/1334* (2013.01); *C09K 2019/0448* (2013.01); *C09K 2019/548* (2013.01); *Y10T 428/10* (2015.01)

(58) Field of Classification Search
    CPC ........... C09K 19/32; C09K 2019/0448; C09K 19/548; G02F 1/1334; Y10T 428/10
    See application file for complete search history.

(56) References Cited

U.S. PATENT DOCUMENTS

| 8,551,358 | B2* | 10/2013 | Lee et al. .................. 252/299.6 |
| 8,697,200 | B2* | 4/2014 | Goetz et al. .................. 428/1.1 |
| 2004/0011996 | A1 | 1/2004 | Klasen-Memmer et al. |
| 2011/0095229 | A1 | 4/2011 | Lee |

FOREIGN PATENT DOCUMENTS

| CN | 101008784 | 8/2007 |
| CN | 101008784 A | 8/2007 |
| EP | 1498468 | 1/2005 |
| EP | 1813594 | 8/2007 |
| JP | 63-233952 | 9/1988 |
| KR | 1020040005616 A | 1/2004 |
| WO | 2009030329 | 3/2009 |

OTHER PUBLICATIONS

English Abstract of JP 63-233952. Publication Date: Sep. 29, 1988. Application No: 62-065709. Filing Date: Mar. 23, 1987. Inventor: Sugiura Michio et al. Title: "Phenanthrene Compound", Applicant: Nippon Steel Chem Co Ltd. 1 page. (Patent Abstacts of Japan).
Institut National De La Propriete Industrielle. "International Search Report." PCT/EP2009/001514. Applicant: Merck Patent GmbH. Mailed Apr. 24, 2009
Yoshida et al., "Self-ordering process of phenanthrene polyesters observed by the simultaneous DSC-XRD method", Journal of Thermal Analysis and Calorimetry, 70:703-711, (2002).
English Translation of CN 101008784A provided by EPO (2007).
CAPLUS 2003: 44681.
CAPLUS 2007: 860899.
Partial (abstract and claims) English Translation of CN 101008784 from Dialog (2007).
English Abstract of CN 101008784, publication date: Aug. 1, 2007.
English Translation of Office Action for related Korean Patent Application No. 2010-7023634, mailing date Apr. 20, 2015.

* cited by examiner

*Primary Examiner* — Shean C Wu
(74) *Attorney, Agent, or Firm* — Millen, White, Zelano & Branigan, P.C.

(57) ABSTRACT

The present invention relates to polymerisable compounds, to processes and intermediates for the preparation thereof, and to the use thereof for optical, electro-optical and electronic purposes, in particular in liquid-crystal (LC) media and LC displays, especially in LC displays of the PS (polymer-stabilised) and PSA (polymer-sustained alignment) type.

7 Claims, No Drawings

LIQUID-CRYSTAL DISPLAY

The present invention relates to polymerisable compounds, to processes and intermediates for the preparation thereof, and to the use thereof for optical, electro-optical and electronic purposes, in particular in liquid-crystal (LC) media and LC displays, especially in LC displays of the PS (polymer-stabilised) or PSA (polymer-sustained alignment) type.

The liquid-crystal displays (LC displays) used at present are usually those of the TN (twisted nematic) type. However, these have the disadvantage of a strong viewing-angle dependence of the contrast. In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place. Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays. Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes realignment of the LC molecules in the layer plane. Furthermore, so-called FFS (fringe-field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are demanded.

A further development are the so-called PS (polymer-stabilised) displays, which are also known under the term "PSA" (polymer-sustained alignment). In these, a small amount (for example 0.3% by weight, typically <1% by weight) of a polymerisable compound is added to the LC medium and, after introduction into the LC cell, is polymerised or crosslinked in situ, usually by UV photopolymerisation, with an electrical voltage applied between the electrodes. The addition of polymerisable mesogenic or liquid-crystalline compounds, also known as "reactive mesogens" (RMs), to the LC mixture has proven particularly suitable. In the meantime, the PSA principle is being used in diverse classical LC displays. Thus, for example, PSA-VA, PSA-OCB, PS-IPS/FFS and PS-TN displays are known. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

In particular for monitor and especially TV applications, optimisation of the response times, but also of the contrast and luminance (thus also transmission) of the LC display continues to be demanded. The PSA method can provide crucial advantages here. In particular in the case of PSA-VA, a shortening of the response times, which correlate with a measurable pretilt in test cells, can be achieved without significant adverse effects on other parameters.

However, it has been found that the LC mixtures and RMs known from the prior art still have some disadvantages on use in PSA displays. Thus, not every desired soluble RM by far is suitable for use in PSA displays, and it is often difficult to find more suitable selection criteria than the direct PSA experiment with pretilt measurement. The choice becomes even smaller if polymerisation by means of UV light without the addition of photoinitiators is desired, which may be advantageous for certain applications. In addition, the LC mixture (also referred to as "LC host mixture" below)+polymerisable component "material system" selected should have the lowest possible rotational viscosity and the best possible electrical properties, with the emphasis here being on the so-called "voltage holding ratio" (VHR or HR). In connection with PSA displays, a high VHR after irradiation with UV light is, in particular, of central importance since UV exposure is a necessary part of the display production process, but naturally also occurs as "normal" exposure in the finished display.

However, the problem arises that not all LC mixture+polymerisable component combinations by far are suitable for PSA displays since, for example, no tilt or an inadequate tilt arises or since, for example, the VHR is inadequate for TFT display applications.

In particular, it would be desirable to have available novel materials for PSA displays which generate a particularly small pretilt angle. Materials which generate a lower pretilt angle during polymerisation for the same exposure time than the materials known to date, and/or through the use of which the (higher) pretilt angle that can be achieved using the known materials can already be achieved after a shorter exposure time would be particularly desirable. The production time (tact time) of the display could thus be shortened and the costs of the production process reduced.

A further problem is the occurrence of so-called "image sticking" or "image burn", i.e. the image generated in the LC display by temporary addressing of individual pixels still remains visible even after the electric field in these pixels has been switched off or after other pixels have been addressed.

A further problem in the production of PSA displays is the presence or removal of unpolymerised RMs, in particular after the polymerisation step for the generation of the pretilt angle in the display. For example, unreacted RMs of this type may adversely affect the properties of the display or polymerise in an uncontrolled manner while a voltage is being applied in the display. Controlled reaction of these residual amounts would be simpler if the RM polymerised more quickly and effectively than the materials known to date.

There is thus still a great demand for PSA displays, in particular of the VA and OCB type, and LC media and polymerisable compounds for use in such displays, which do not have the disadvantages described above or only do so to a small extent and have improved properties. In particular, there is a great demand for PSA displays and for materials for use in PSA displays which facilitate a high specific resistance at the same time as a large working-temperature range, short response times, even at low temperatures, and a low threshold voltage, a low pretilt angle, a multiplicity of grey shades, high contrast and a broad viewing angle, and have high values of the voltage holding ratio (VHR) after UV exposure.

The invention has the object of providing novel suitable materials, in particular RMs and LC media comprising these, for use in PSA displays which do not have the disadvantages indicated above or only do so to a reduced extent, polymerise as quickly and completely as possible, enable a low pretilt angle to be established, reduce or prevent the occurrence of image sticking in the display, and preferably at the same time facilitate very high specific resistance values, low threshold voltages and short response times.

A further object of the invention is the provision of novel RMs, in particular for optical, electro-optical and electronic applications, and of suitable processes and intermediates for the preparation thereof.

This object has been achieved in accordance with the invention by materials and processes as described in the present application. In particular, it has been found, surprisingly, that polymerisable compounds according to the invention facilitate particularly low pretilt angles and fast establishment of the desired tilt angles on use in PSA displays. This has been demonstrated in connection with an LC medium by means of pretilt measurements. In particular, a pretilt has been achieved without the addition of photoinitiator. In addition, the materials according to the invention exhibit significantly faster generation of the pretilt angle compared with the materials known from the prior art, as has been demonstrated by exposure time-dependent measurements of the pretilt angle.

The invention thus relates to the use of polymerisable compounds of the formula I

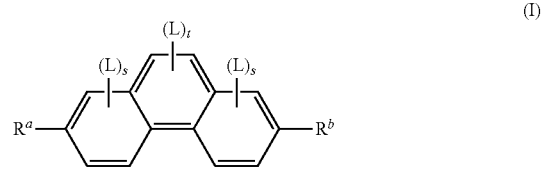

in which the individual radicals have the following meanings:
$R^a$ and $R^b$ denote P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^{00}$)═C (R$^{000}$)—, —C≡C—, —N(R)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$ and $R^b$ denotes or contains a group P-Sp-,
P on each occurrence, identically or differently, denotes a polymerisable group,
Sp on each occurrence, identically or differently, denotes a spacer group or a single bond,
$R^{00}$ and $R^{000}$ each, independently of one another, denote H or alkyl having 1 to 12 C atoms,
L on each occurrence, identically or differently, denotes P-Sp-, H, OH, halogen, SF$_5$, NO$_2$, a carbon group or hydrocarbon group,
s on each occurrence, identically or differently, denotes 0, 1, 2 or 3,
t denotes 0, 1 or 2,
where the following compounds are preferably excluded:

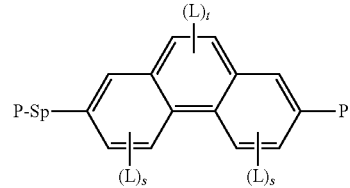

in which Sp denotes a spacer group, and P, L, s and t have the meaning indicated above,
in liquid-crystal (LC) media and LC displays, in particular in LC displays of the PS (polymer-stabilised) or PSA (polymer-sustained alignment) type.

The invention furthermore relates to an LC medium comprising one or more polymerisable compounds of the formula I and one or more additional compounds, which may also be mesogenic, liquid-crystalline and/or polymerisable.

The invention furthermore relates to an LC medium comprising
a polymerisable component A) comprising one or more polymerisable compounds of the formula I, and
a liquid-crystalline component B), also referred to below as "LC host mixture", comprising one or more, preferably two or more, low-molecular-weight (monomeric and unpolymerisable) compounds as described above and below.

The invention furthermore relates to the use of compounds of the formula I and LC media according to the invention in PS and PSA displays, in particular the use in PS and PSA displays containing an LC medium, for the generation of a tilt angle in the LC medium by in-situ polymerisation of the compound(s) of the formula I in the PSA display with application of an electric or magnetic field.

The invention furthermore relates to an LC display containing one or more compounds of the formula I or an LC medium according to the invention, in particular a PS or PSA display, particularly preferably a PSA-VA, PSA-OCB, PS-IPS, PS-FFS or PS-TN display.

The invention furthermore relates to an LC display of the PS or PSA type containing an LC cell consisting of two substrates, where at least one substrate is transparent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, where at least one of the polymerisable compounds is selected from formula I.

The invention furthermore relates to a process for the preparation of an LC medium as described above and below by mixing one or more low-molecular-weight liquid-crystalline compounds, or an LC host mixture as described above and below, with one or more polymerisable compounds of the formula I or sub-formulae thereof, and optionally with further liquid-crystalline compounds and/or additives.

The invention furthermore relates to a process for the production of an LC display as described above and below by mixing one or more low-molecular-weight liquid-crystalline compounds, or an LC host mixture as described above and below, with one or more polymerisable compounds of the formula I or sub-formulae thereof, and optionally with further liquid-crystalline compounds and/or additives, introducing the mixture into an LC cell as described above and below, and polymerising the polymerisable compounds with application of an electrical voltage.

The invention furthermore relates to novel polymerisable compounds of the formula I, and to processes for the preparation thereof.

The following meanings apply above and below:
The term "PSA" is, unless indicated otherwise, used to represent PS displays and PSA displays.
The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value of the tilt angle (i.e. a large deviation from the 90° angle) corresponds to a large tilt. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing a mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

Particular preference is given to LC media comprising one, two or three polymerisable compounds of the formula I.

Preference is furthermore given to LC media in which the polymerisable component (component A) comprises exclusively polymerisable compounds of the formula I.

Preference is furthermore given to LC media in which component B) is an LC compound or an LC mixture which has a nematic liquid-crystal phase.

Preference is furthermore given to achiral polymerisable compounds and to LC media comprising, preferably consisting exclusively of, achiral compounds.

The polymerisable compounds can be added individually to the LC media, but it is also possible to use mixtures comprising two or more polymerisable compounds according to the invention. Polymerisation of mixtures of this type gives copolymers. The invention furthermore relates to the polymerisable mixtures mentioned above and below. The polymerisable compounds can be mesogenic or non-mesogenic.

The proportion of the polymerisable component or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

Particularly preferred compounds of the formula I are those in which

L denotes P—Sp—, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, straight-chain or branched alkyl or alkoxy having 1 to 25 C atoms, or straight-chain or branched alkenyl, alkynyl, alkylcarbonyl, alkoxycarbonyl, alkylcarbonyloxy or alkoxycarbonyloxy having 2 to 25 C atoms, in which, in addition, one or more H atoms in all these groups may be replaced by F, Cl or P-Sp-, Y$^1$ denotes halogen, and R$^x$ denotes P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-.

Further preferred compounds of the formula I are those in which

R$^a$ and R$^b$ denote identical or different radicals P-Sp-,

R$^a$ and R$^b$ denote identical or different radicals P-Sp- in which both radicals Sp denote a single bond or C$_{1-12}$-alkyleneoxy, one of the radicals R$^a$ and R$^b$ denotes or contains a group P-Sp- and the other denotes an unpolymerisable group, preferably selected from straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN, R$^a$ denotes P-Sp-, R$^b$ denotes P-Sp-, Sp denotes a single bond, L does not denote or contain a polymerisable group, s denotes 0, one or both indices s are ≥1 and/or t≥1, and L is an unpolymerisable group, preferably selected from F, Cl, —CN and straight-chain or branched alkyl having 1 to 25, particularly preferably 1 to 10, C atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN.

Particularly preferred compounds of the formula I are selected from the group consisting of the following sub-formulae:

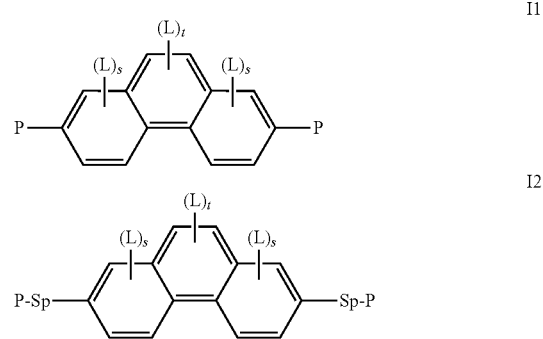

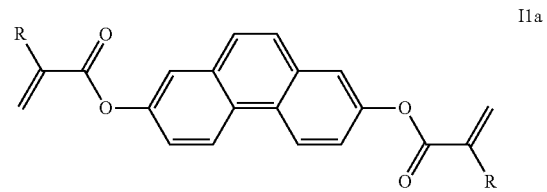

in which Sp denotes a spacer group, and P, L, s and t each, independently of one another, have one of the meanings indicated above and below. Particular preference is given to compounds of the formulae I1 and I2 in which s and t are 0. P in these compounds preferably denotes an acrylate, fluoroacrylate or methacrylate group. Sp in these compounds preferably denotes straight-chain alkyleneoxy having 1, 2, 3, 4, 5 or 6 C atoms.

Particular preference is given to compounds of the formula I1a

I1a in which R denotes H, F, Cl, CN, CF$_3$ or CH$_3$, in particular H or CH$_3$.

Preferred unpolymerisable radicals R$^a$ and R$^b$ are optionally substituted alkyl, alkenyl, alkynyl, alkoxy, alkylcarbonyl, alkoxycarbonyl, alkylcarbonyloxy and alkoxycarbonyloxy having 1 to 20, preferably 1 to 12, C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C=O triple bond, and groups which are suitable for polymerisation with ring opening, such as, for example, oxetane or epoxide groups.

Preferred groups P are selected from $CH_2=CW^1-COO-$, $CH_2=CW^1-CO-$,

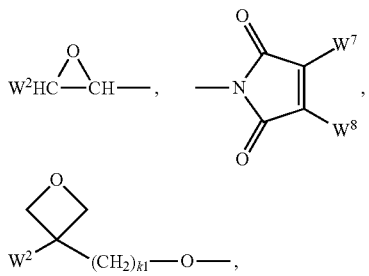

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$ and $W^4W^5W^6Si-$, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are different from P-Sp-, and $k_1$, $k_2$ and $k_3$ each, independently of one another, denote 0 or 1, $k_3$ preferably denotes 1.

Particularly preferred groups P are $CH_2=CW^1-COO-$, in particular $CH_2=CH-COO-$, $CH_2=C(CH_3)-COO-$ and $CH_2=CF-COO-$, furthermore $CH_2=CH-O-$, $(CH_2=CH)_2CH-OCO-$, $(CH_2=CH)_2CH-O-$,

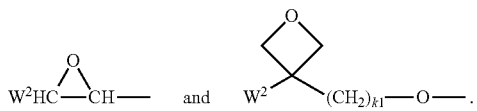

Very particularly preferred groups P are vinyloxy, acrylate, methacrylate, fluoroacrylate, chloroacrylate, oxetane and epoxide, in particular acrylate and methacrylate.

Preferred spacer groups Sp are selected from the formula Sp'-X', so that the radical P-Sp- corresponds to the formula P-Sp'-X'—, where Sp' denotes alkylene having 1 to 20, preferably 1 to 12, C atoms, which is optionally mono- or polysubstituted by F, Cl, Br, I or CN, and in which, in addition, one or more non-adjacent $CH_2$ groups may each be replaced, independently of one another, by $-O-$, $-S-$, $-NH-$, $-NR^0-$, $-SiR^{00}R^{000}-$, $-CO-$, $-COO-$, $-OCO-$, $-OCO-O-$, $-S-CO-$, $-CO-S-$, $-NR^{00}-CO-O-$, $-O-CO-NR^{00}-$, $-NR^{00}-CO-NR^{00}-$, $-CH=CH-$ or $-C\equiv C-$ in such a way that O and/or S atoms are not linked directly to one another, X' denotes $-O-$, $-S-$, $-CO-$, $-COO-$, $-OCO-$, $-O-OCO-$, $-CO-NR^{00}-$, $-NR^{00}-CO-$, $-NR^{00}-CO-NR^{00}-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^0-$, $-CY^2=CY^3-$, $-C\equiv C-$, $-CH=CH-COO-$, $-OCO-CH=CH-$ or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X' is preferably $-O-$, $-S-$, $-CO-$, $-COO-$, $-OCO-$, $-O-COO-$, $-CO-NR^0-$, $-NR^0-CO-$, $-NR^0-CO-NR^0-$ or a single bond.

Typical spacer groups Sp' are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^{00}R^{000}-O)_{p1}$, in which p1 is an integer from 1 to 12, q1 is an integer from 1 to 3, and $R^{00}$ and $R^{000}$ have the above-mentioned meanings.

Particularly preferred groups $-X'-Sp'-$ are $-(CH_2)_{p1}-$, $-O-(CH_2)_{p1}-$, $-OCO-(CH_2)_{p1}-$, $-OCOO-(CH_2)_{p1}$.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, $R^a$ and/or $R^b$ in formula I denote a radical containing two or more polymerisable groups (multifunctional polymerisable radicals). Suitable radicals of this type, and polymerisable compounds containing them and the preparation thereof, are described, for example, in U.S. Pat. No. 7,060,200 B1 or US 2006/0172090 A1. Particular preference is given to multifunctional polymerisable radicals selected from the following formulae:

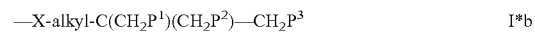
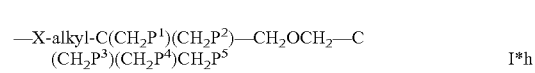

in which
alkyl denotes a single bond or straight-chain or branched alkylene having 1 to 12 C atoms, in which one or more non-adjacent $CH_2$ groups may each be replaced, independently of one another, by $-C(R^{00})=C(R^{000})-$, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^{00}$ and R$^{000}$ have the meaning indicated above, aa and bb each, independently of one another, denote 0, 1, 2, 3, 4, 5 or 6, X has one of the meanings indicated for X', and P$^{1-5}$ each, independently of one another, have one of the meanings indicated for P.

The compounds of the formula I and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. For example, the synthesis of compounds of the formula I is carried out by esterification or etherification of 2,7-dihydroxyphenanthrene using corresponding acids, acid derivatives, or halogenated compounds containing a group P, such as, for example, (meth)acryloyl chloride or (meth)acrylic acid, in the presence of a dehydrating reagent, such as, for example, DCC (dicyclohexylcarbodiimide).

Compounds of the formula IIa in which R denotes CH$_3$ (phenanthryl 2,7-dimethacrylate) and the preparation thereof are described in JP 63-233952.

For the production of PSA displays, the polymerisable compounds are polymerised or crosslinked (if one compound contains two or more polymerisable groups) in the LC medium between the substrates of the LC display with application of a voltage by in-situ polymerisation. The polymerisation can be carried out in one step. It is also possible firstly to carry out the polymerisation in a first step with application of a voltage in order to generate a pretilt angle and subsequently to polymerise or crosslink the compounds which have not reacted in the first step ("end curing") in a second polymerisation step without an applied voltage.

Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure 184®, Irgacure907®, Irgacure369® or Darocure1173® (Ciba AG). If an initiator is employed, its proportion is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG), such as, for example, Irganox® 1076. If stabilisers are employed, their proportion, based on the total amount of the RMs or the polymerisable component A), is preferably 10-10,000 ppm, particularly preferably 50-500 ppm.

The polymerisable compounds according to the invention are also suitable for polymerisation without initiator, which is associated with considerable advantages, such as, for example, lower material costs and in particular less contamination of the LC medium by possible residual amounts of the initiator or degradation products thereof.

The LC media according to the invention for use in PSA displays preferably comprise <5% by weight, particularly preferably <1% by weight, very particularly preferably <0.5% by weight, of polymerisable compounds, in particular polymerisable compounds of the above-mentioned formulae.

Particular preference is given to LC media comprising one, two or three polymerisable compounds of the formula I.

Preference is furthermore given to LC media in which the polymerisable component A) consists exclusively of polymerisable compounds of the formula I.

Preference is furthermore given to LC media in which component B) is an LC compound or an LC mixture which has a nematic liquid-crystal phase.

Preference is furthermore given to achiral polymerisable compounds of the formula I and to LC media in which the compounds of component A) and/or B) are selected exclusively from the group consisting of achiral compounds.

Preference is furthermore given to LC media in which the polymerisable component or component A) comprises one or more polymerisable compounds containing one polymerisable group (monoreactive) and one or more polymerisable compounds containing two or more, preferably two, polymerisable groups (di- or multireactive).

Preference is furthermore given to PSA displays and LC media in which the polymerisable component or component A) consists exclusively of polymerisable compounds containing two polymerisable groups (direactive).

The proportion of the polymerisable component or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

The polymerisable compounds of the formula I can be polymerised individually, but it is also possible to polymerise mixtures which comprise two or more compounds of the formula I, or mixtures comprising one or more compounds of the formula I and one or more further polymerisable compounds (comonomers), which are preferably mesogenic or liquid-crystalline. Polymerisation of mixtures of this type gives copolymers. The invention furthermore relates to the polymerisable mixtures mentioned above and below. The polymerisable compounds and comonomers are mesogenic or non-mesogenic, preferably mesogenic or liquid-crystalline.

Suitable and preferred mesogenic comonomers, particularly for use in PSA displays, are, for example, selected from the following formulae:

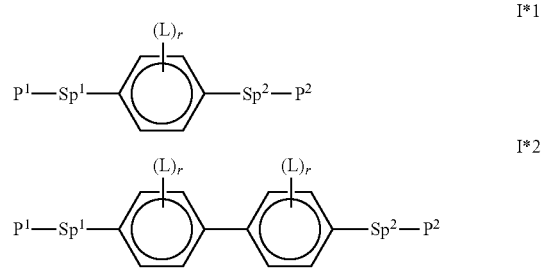

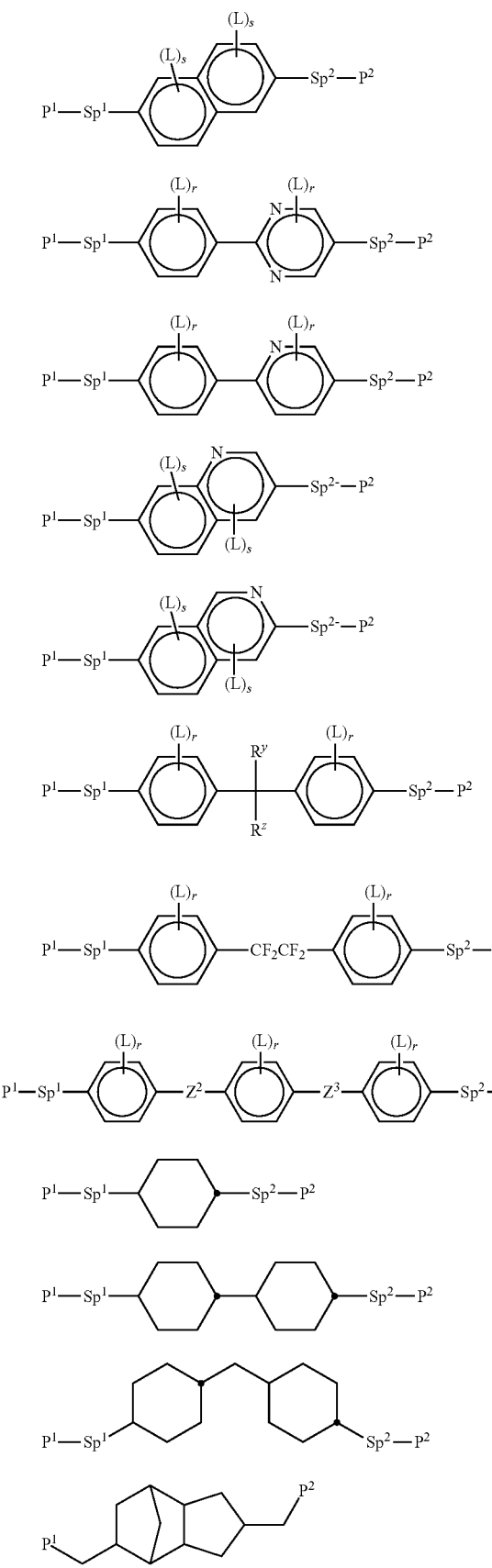
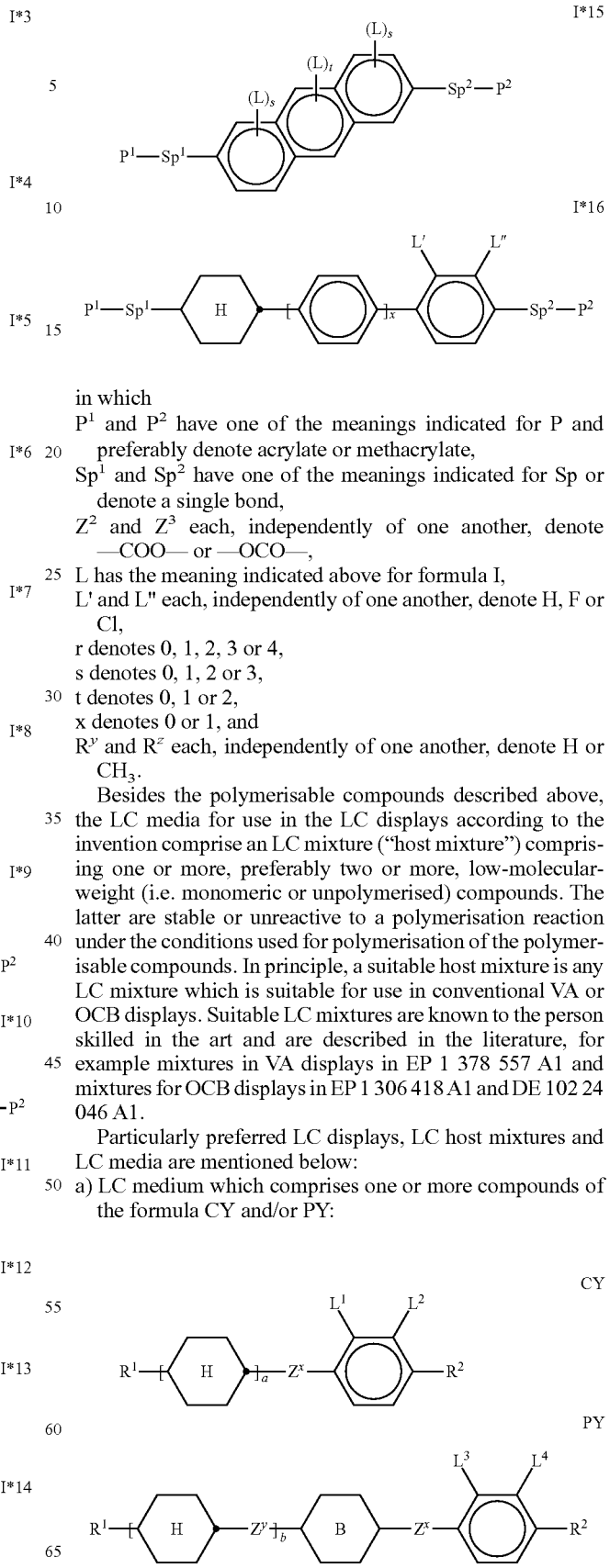

in which
P¹ and P² have one of the meanings indicated for P and preferably denote acrylate or methacrylate,
Sp¹ and Sp² have one of the meanings indicated for Sp or denote a single bond,
$Z^2$ and $Z^3$ each, independently of one another, denote —COO— or —OCO—,
L has the meaning indicated above for formula I,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1, and
$R^y$ and $R^z$ each, independently of one another, denote H or $CH_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, a suitable host mixture is any LC mixture which is suitable for use in conventional VA or OCB displays. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

Particularly preferred LC displays, LC host mixtures and LC media are mentioned below:
a) LC medium which comprises one or more compounds of the formula CY and/or PY:

in which the individual radicals have the following meanings:

a denotes 1 or 2,
b denotes 0 or 1,

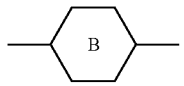

denotes

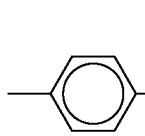 or 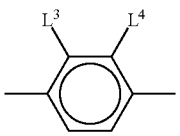

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —OCO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl, or both radicals $L^3$ and $L^4$ denote F or one of the radicals $L^3$ and $L^4$ denotes F and the other denotes Cl.

The compounds of the formula CY are preferably selected from the group consisting of the following sub-formulae:

CY1
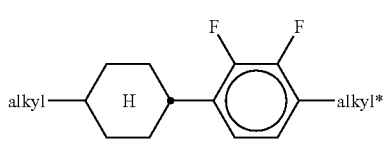

CY2
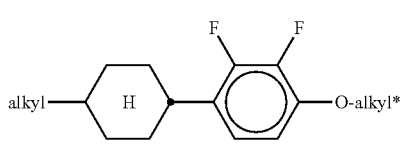

CY3
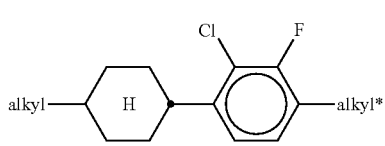

CY4
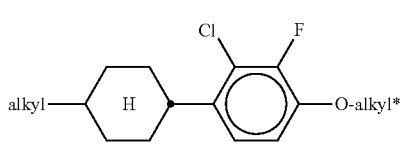

CY5
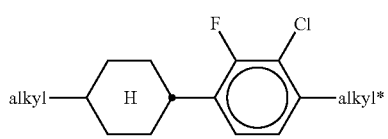

CY6
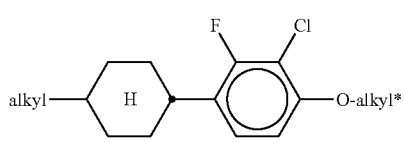

CY7
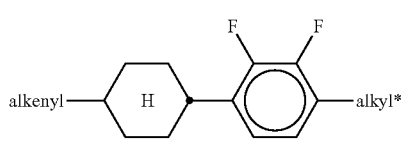

CY8
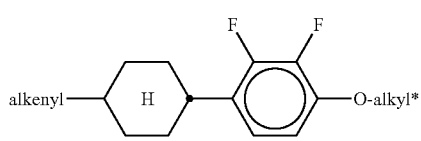

CY9
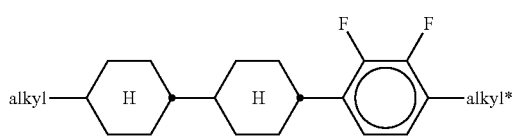

CY10
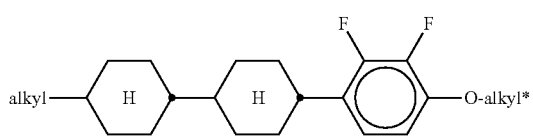

CY11
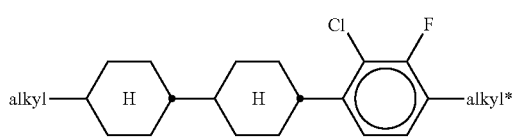

CY12
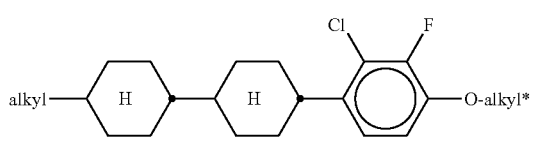

CY13
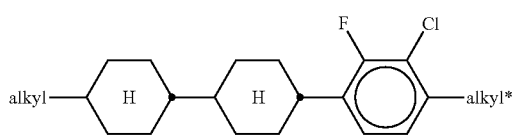

CY14
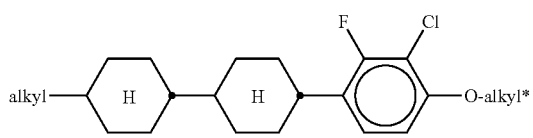

-continued

CY15
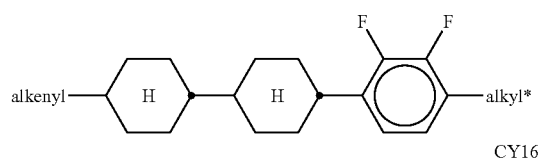

CY16
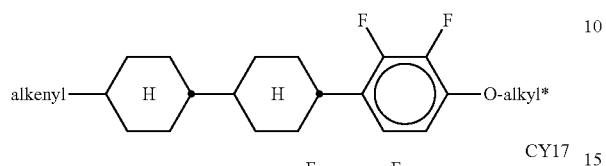

CY17
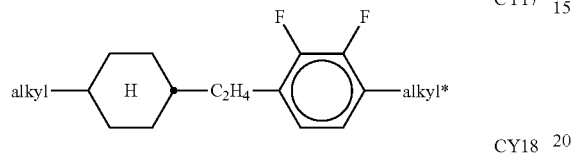

CY18
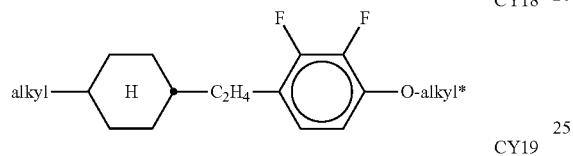

CY19
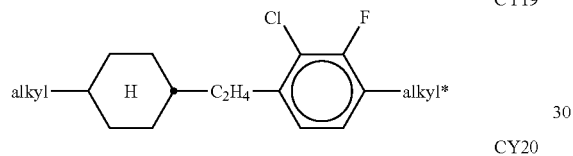

CY20
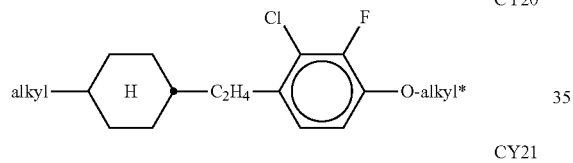

CY21
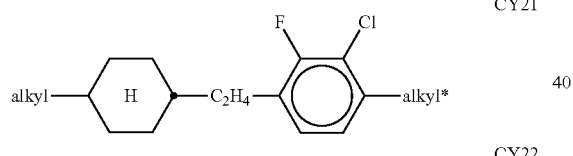

CY22
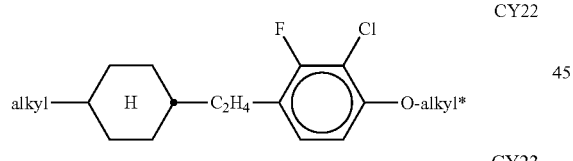

CY23
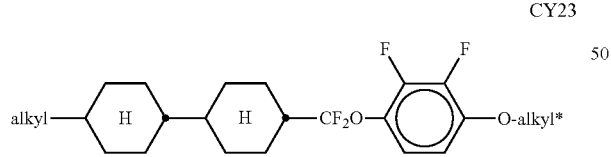

CY24
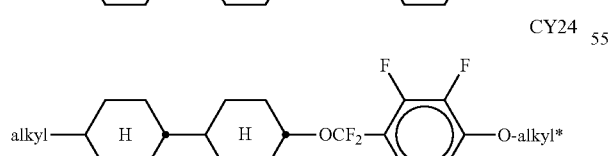

CY25
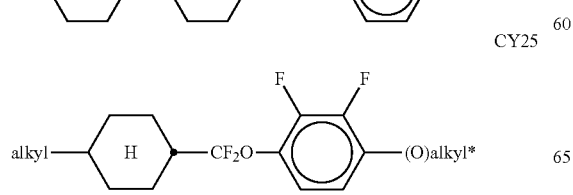

-continued

CY25
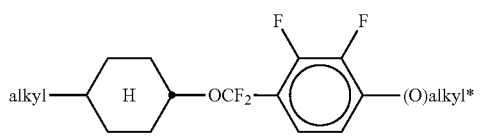

CY26
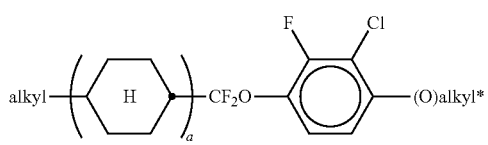

CY27

CY28 in which a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

PY1
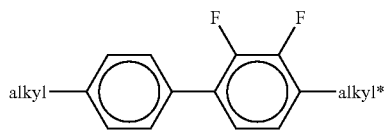

PY2
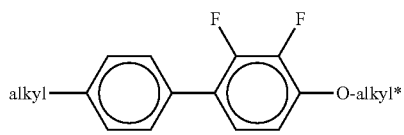

PY3
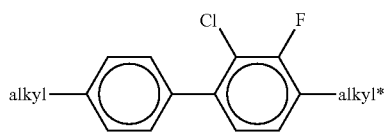

PY4
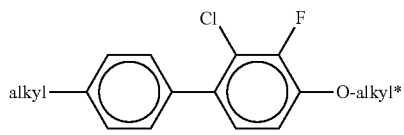

PY5
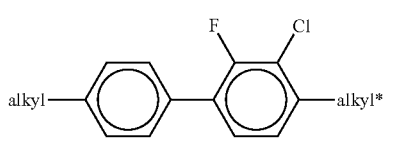

PY6
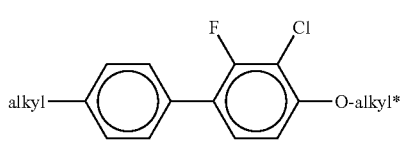

PY7
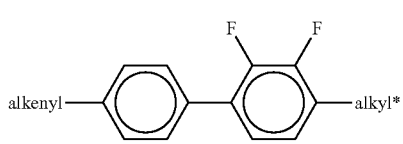

PY8
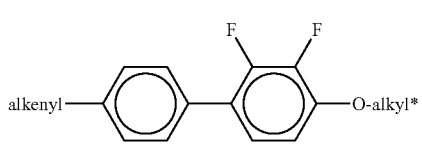

PY9
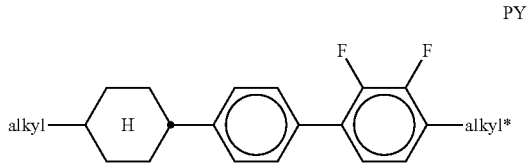

PY10
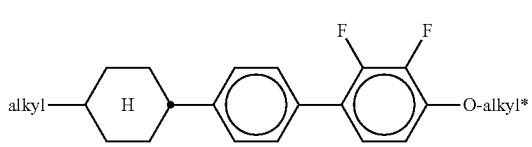

PY11
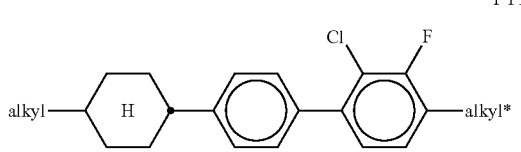

PY12
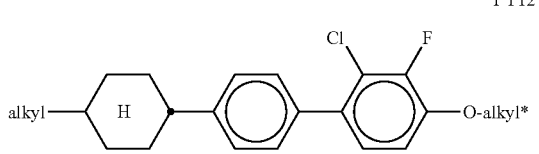

PY13
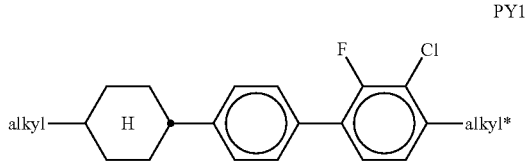

PY14
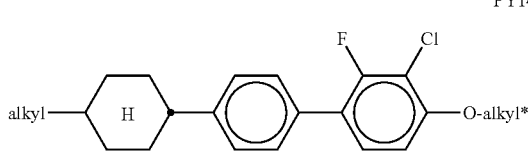

PY15
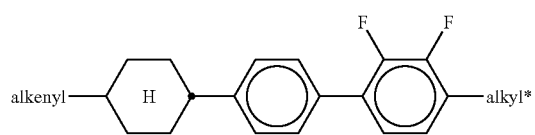

PY16
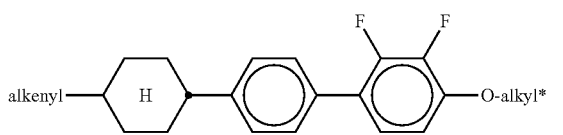

PY17
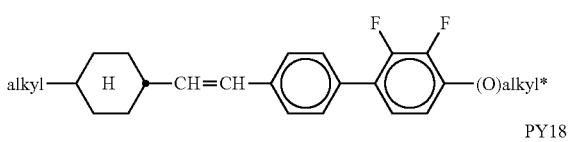

PY18
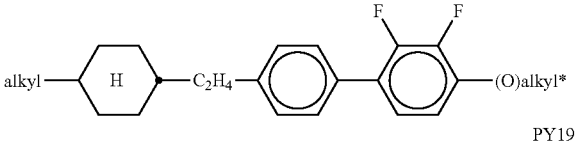

PY19
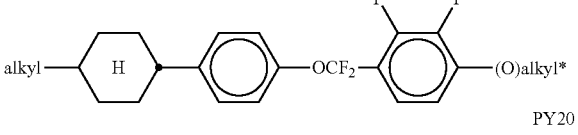

PY20
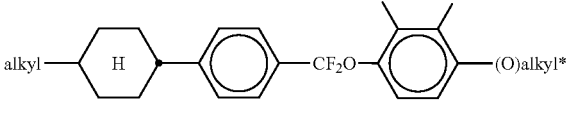

in which alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

ZK
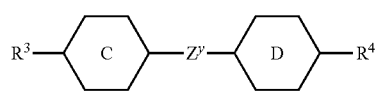

in which the individual radicals have the following meanings:

denotes

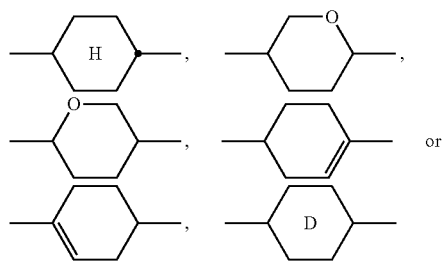

denotes

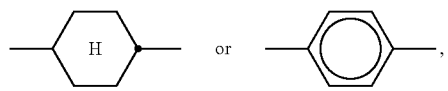

R³ and R⁴ each, independently of one another, denote alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, $Z^y$ denotes —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O— or a single bond, preferably a single bond.

The compounds of the formula ZK are preferably selected from the group consisting of the following sub-formulae:

ZK1

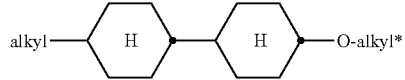
ZK2

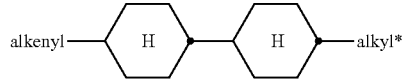
ZK3

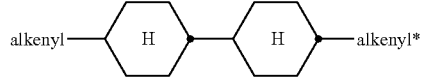
ZK4

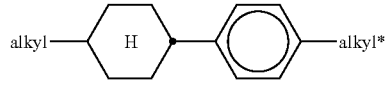
ZK5

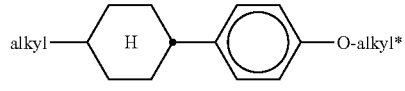
ZK6

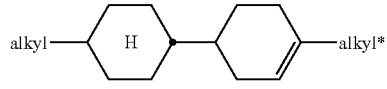
ZK7

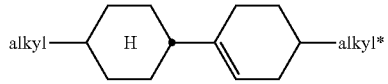
ZK8

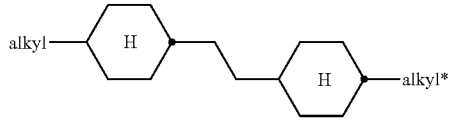
ZK9

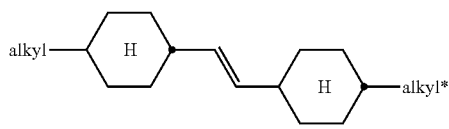
ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

c) LC medium which additionally comprises one or more compounds of the following formula:

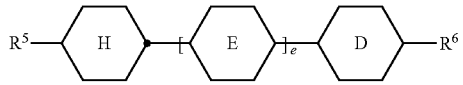
DK in which the individual radicals on each occurrence, identically or differently, have the following meanings:

R⁵ and R⁶ each, independently of one another, have one of the meanings indicated for R¹ above,

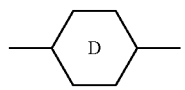

denotes

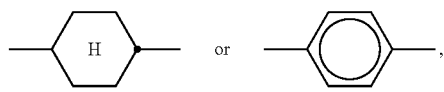

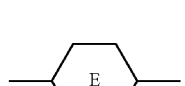

denotes

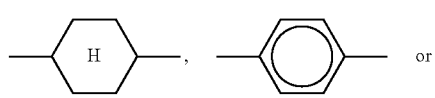

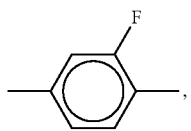

and e denotes 1 or 2.

The compounds of the formula DK are preferably selected from the group consisting of the following sub-formulae:

DK1

DK2
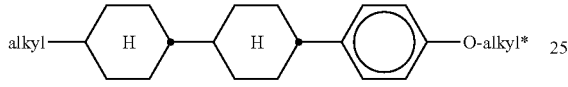

DK3
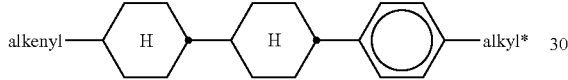

DK4
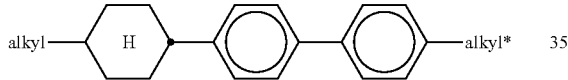

DK5
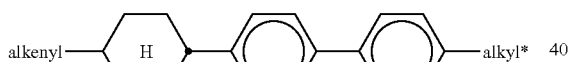

DK6
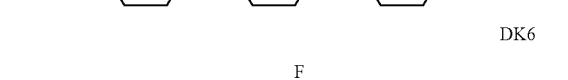

DK7
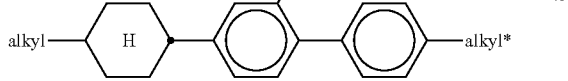

DK8
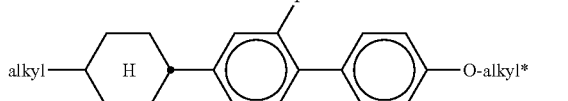

DK9

DK10
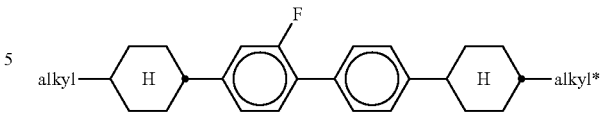

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium which additionally comprises one or more compounds of the following formula:

LY
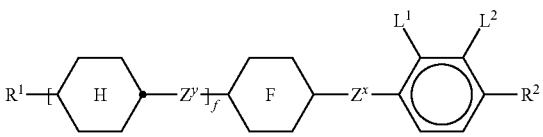

in which the individual radicals have the following meanings:

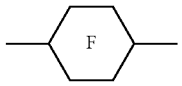

denotes

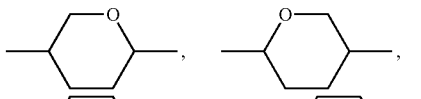

or 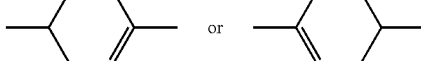

f denotes 0 or 1,

R$^1$ and R$^2$ each, independently of one another, denote alkyl having 1 to 12 C atoms, in which, in addition, one or two non-adjacent CH$_2$ groups may be replaced by —O—, —CH=CH—, —CO—, —OCO— or —OCO— in such a way that O atoms are not linked directly to one another, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

LY1 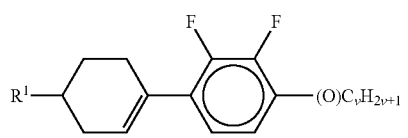

LY2 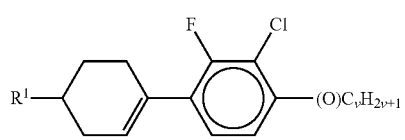

LY3 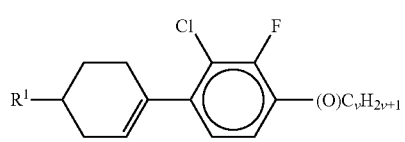

LY4 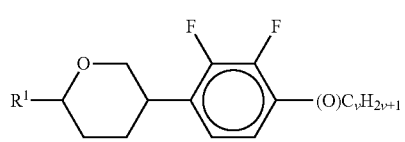

LY5 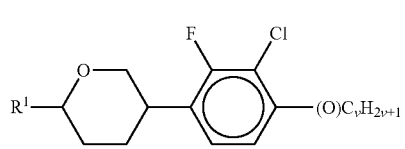

LY6 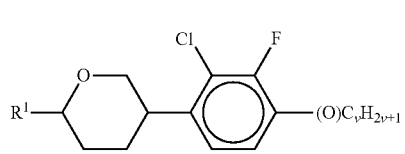

LY7 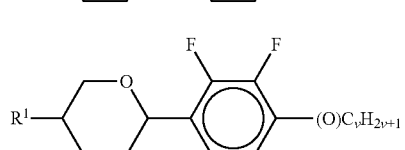

LY8 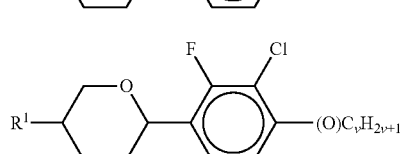

LY9 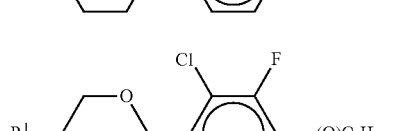

LY10 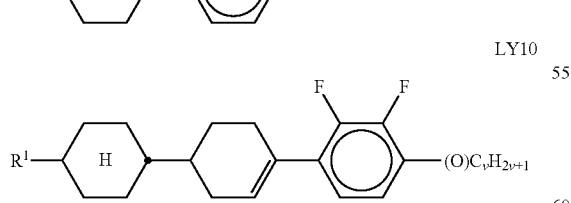

LY11 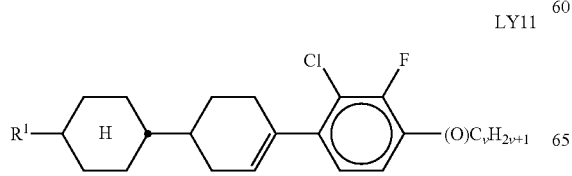

-continued

LY12 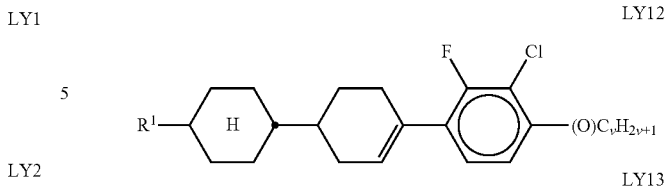

LY13 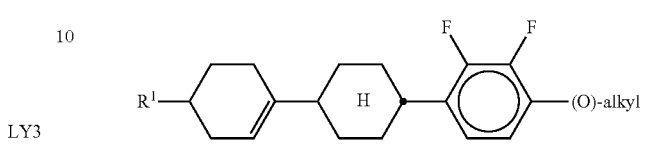

LY14 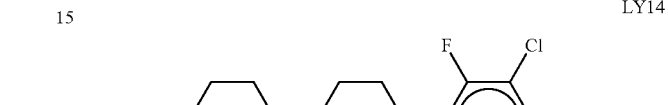

LY15 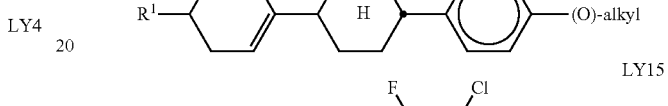

LY16 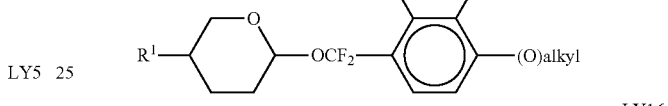

LY17 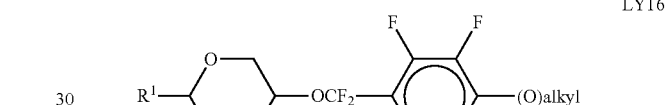

LY18 

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

e) LC medium which additionally comprises one or more compounds selected from the group consisting of the following formulae:

G1 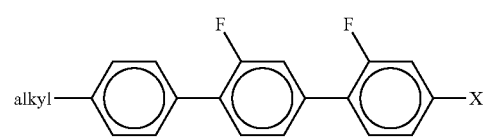

-continued

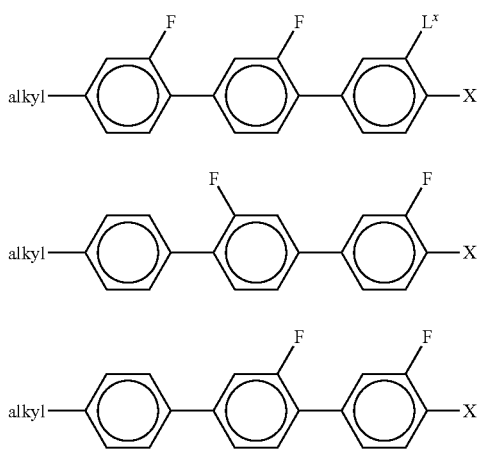

in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

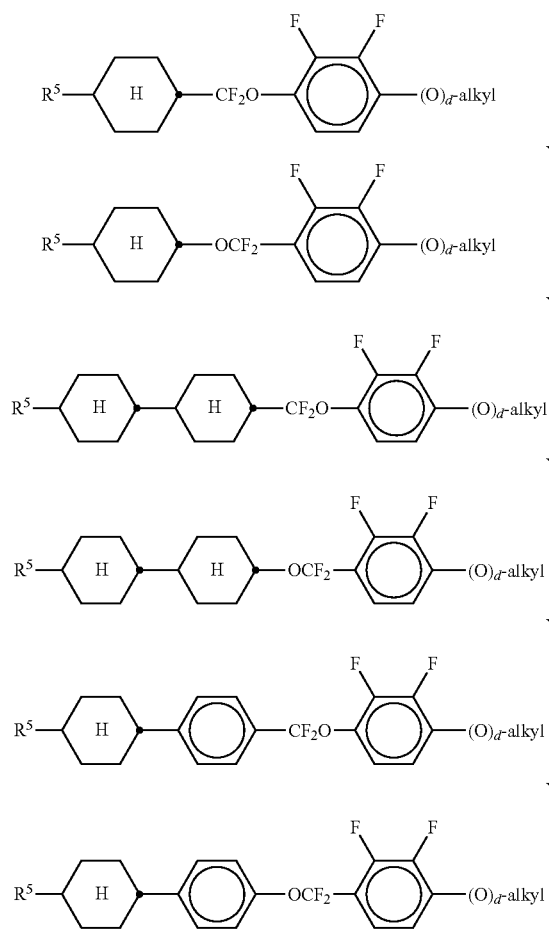

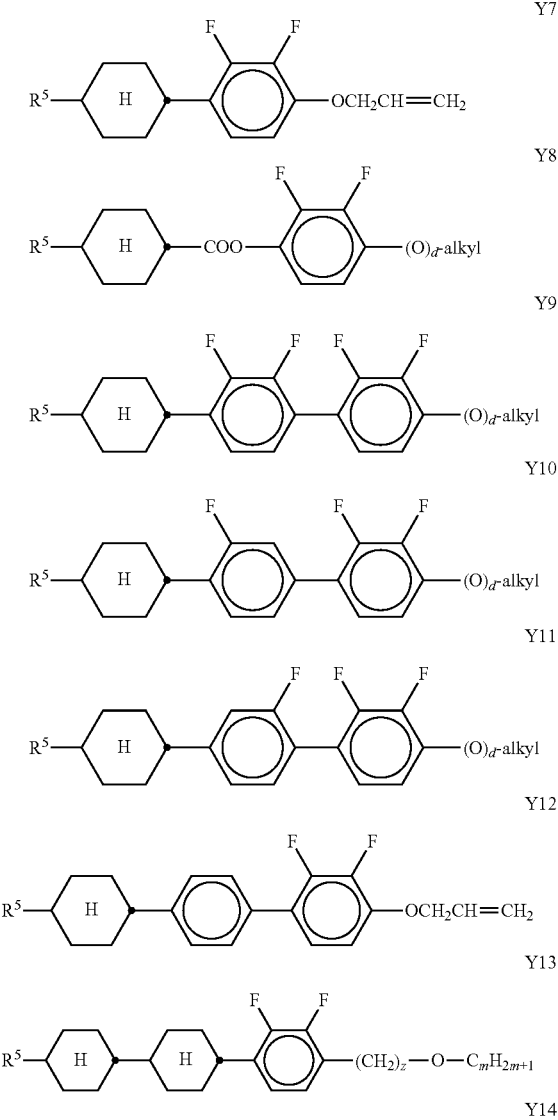

in which $R^5$ has one of the meanings indicated for $R^1$ above, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

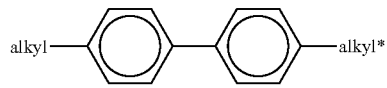

B1

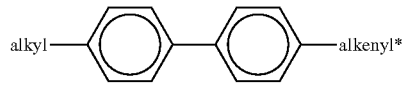

B2

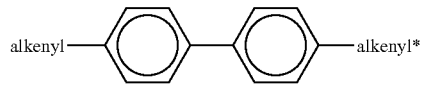

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

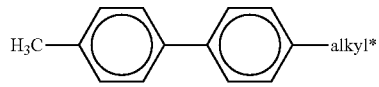

B1a

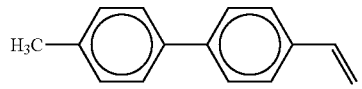

B2a

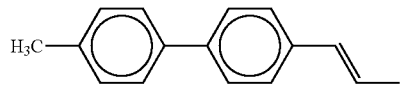

B2b

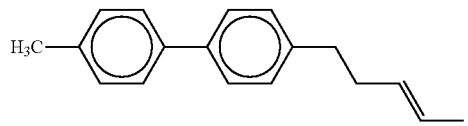

B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

T in which $R^5$ and $R^6$ each, independently of one another, have one of the meanings indicated for $R^1$ above, and

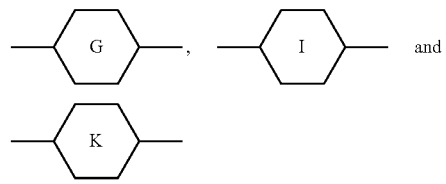

each, independently of one another, denote

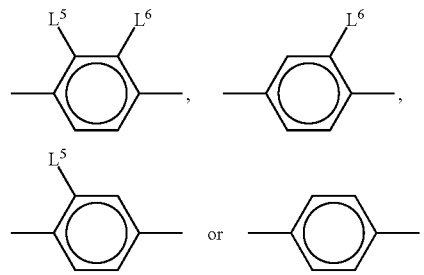

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

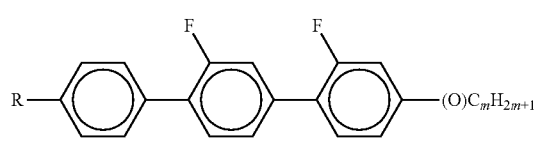

T1

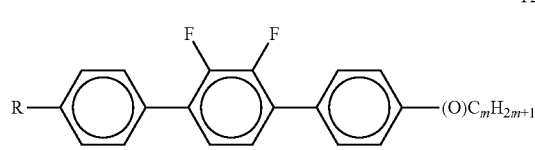

T2

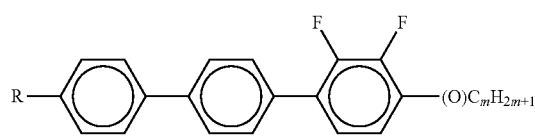

T3

T4
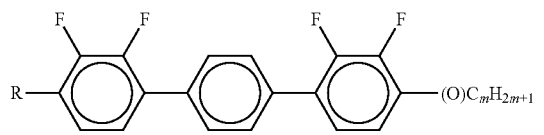
T5
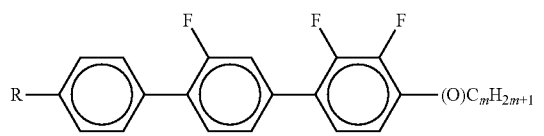
T6
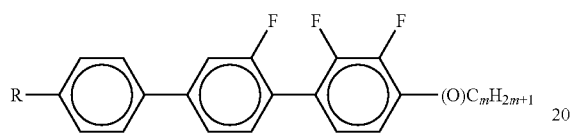
T7
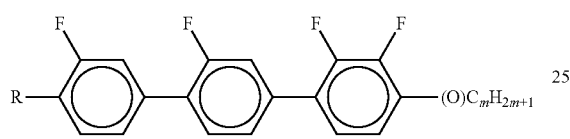
T8
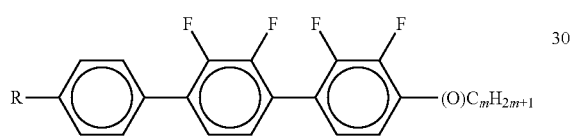
T9
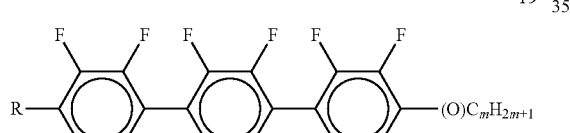
T10
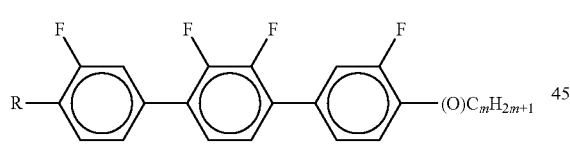
T11
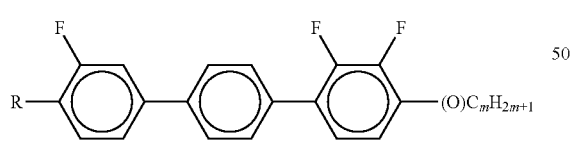
T12
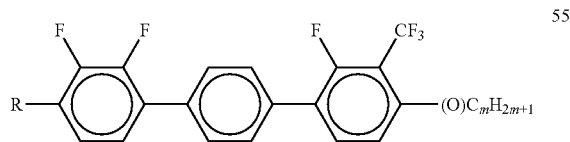
T13
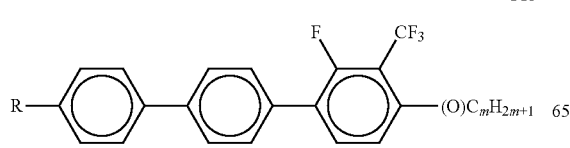
T14
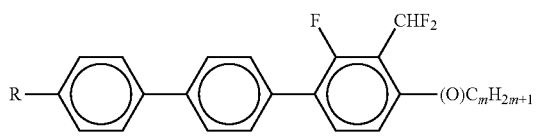
T15
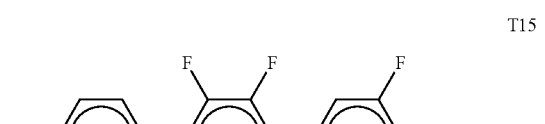
T16
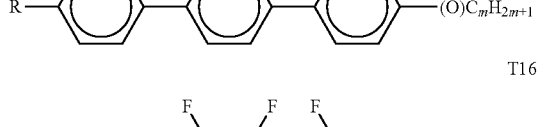
T17
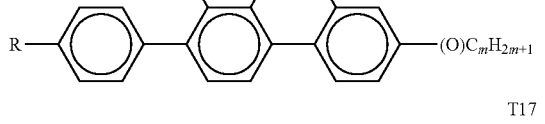
T18
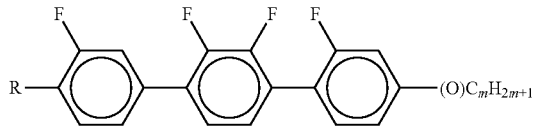
T19
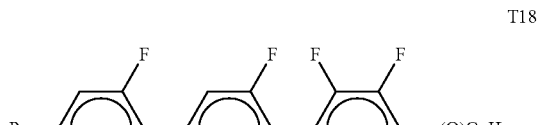
T20
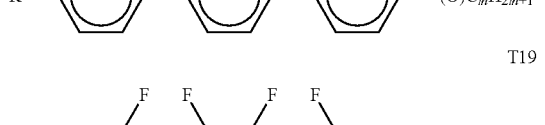
T21
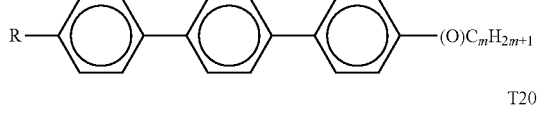
T22
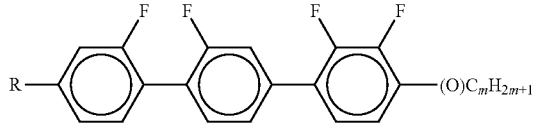
T23
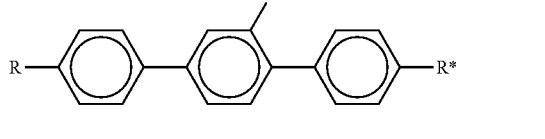

-continued

T24

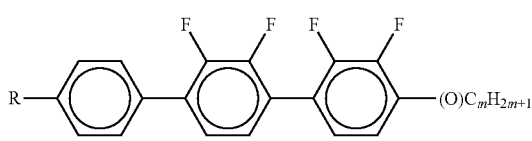

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is intended to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

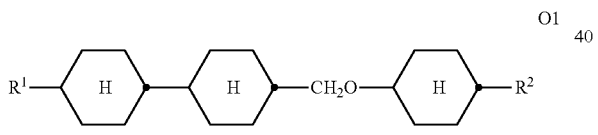
O1

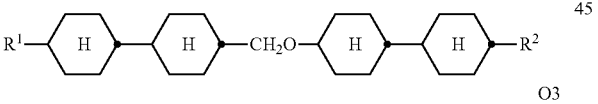
O2

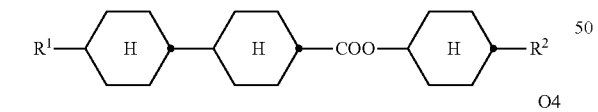
O3

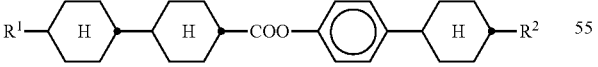
O4

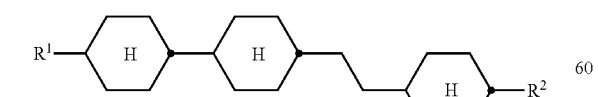
O5

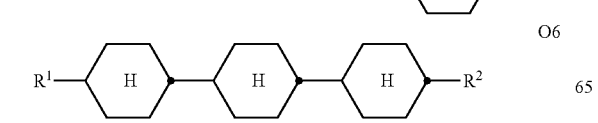
O6

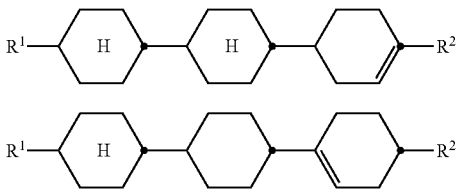
O7

O8

O9

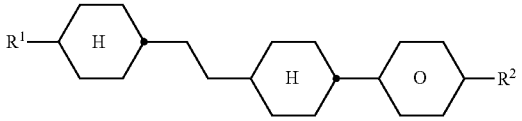
O10

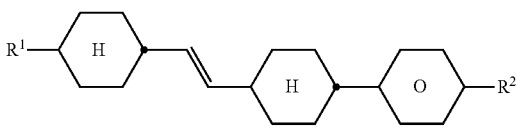

O11

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

FI

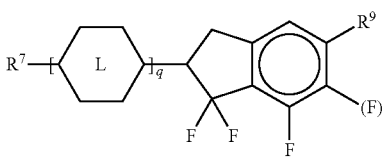

in which

denotes

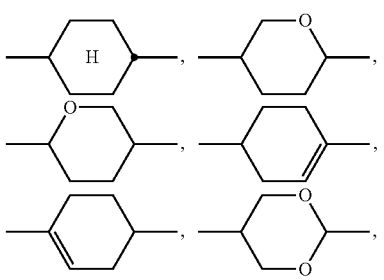

-continued

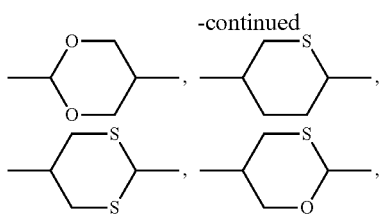

$R^9$ denotes H, CH$_3$, C$_2$H$_5$ or n-C$_3$H$_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following subformulae:

FI1
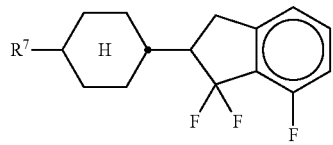

FI2
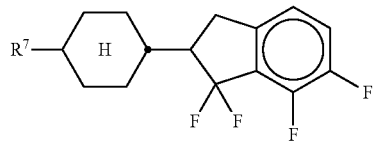

FI3
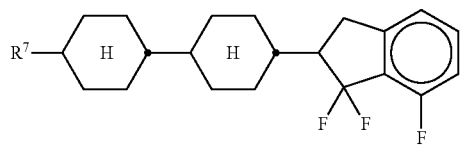

FI4
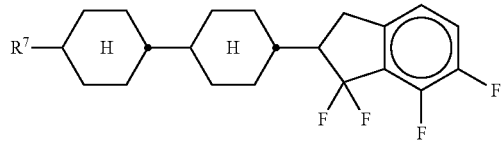

FI5
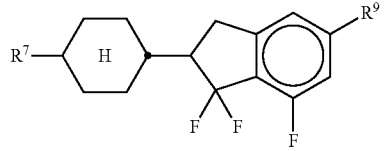

FI6
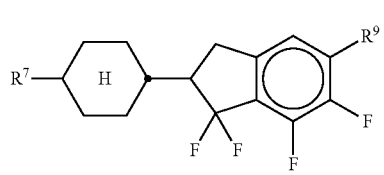

FI7
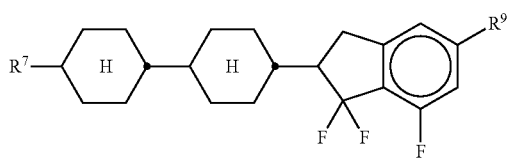

FI8
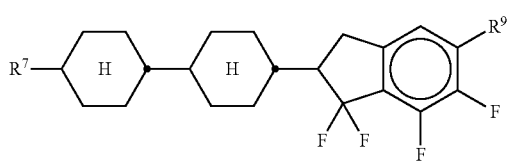

in which $R^7$ preferably denotes straight-chain alkyl, and $R^9$ denotes CH$_3$, C$_2$H$_5$ or n-C$_3$H$_7$. Particular preference is given to the compounds of the formulae FI1, FI2 and FI3.

m) LC medium which additionally comprises one or more compounds selected from the group consisting of the following formulae:

VK1
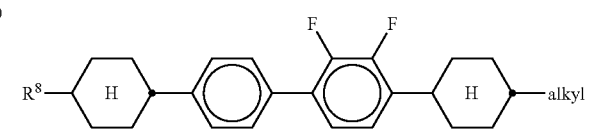

VK2
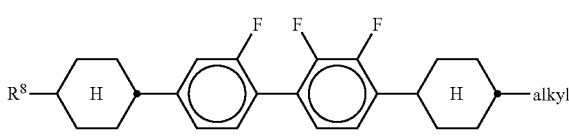

VK3
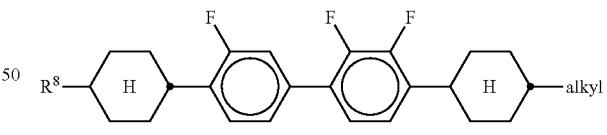

VK4
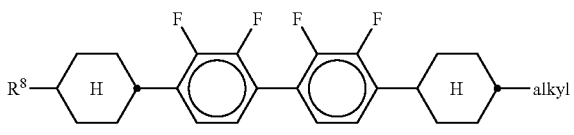

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

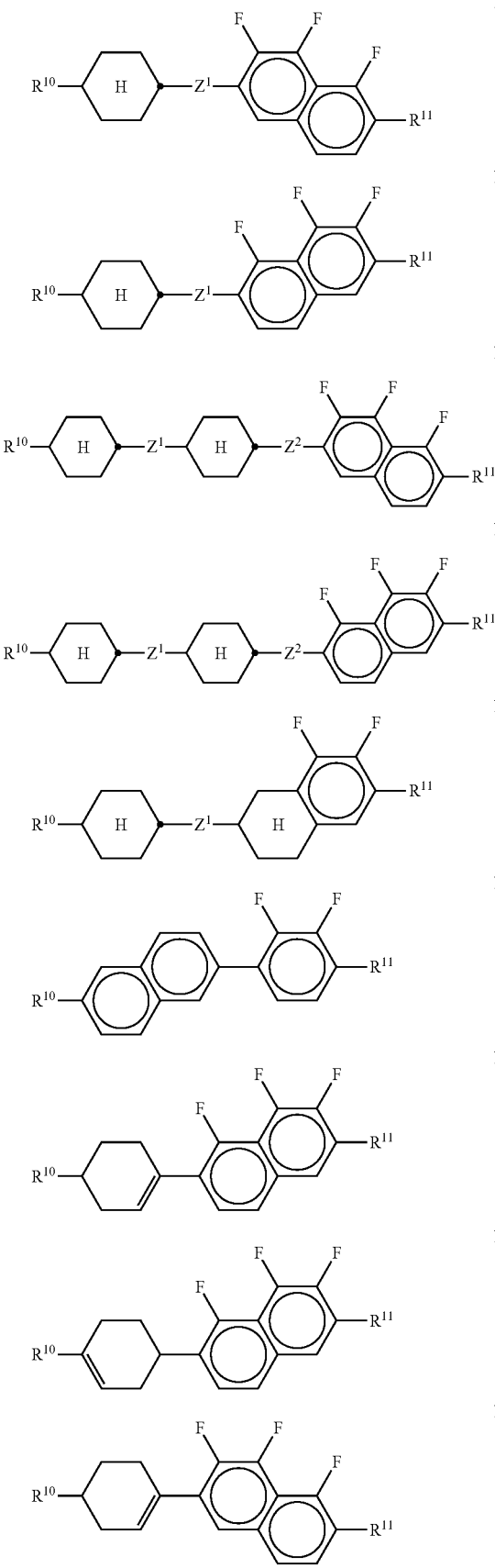

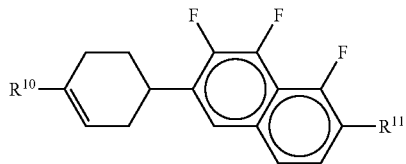

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

o) LC medium which additionally comprises one or more difluoro-dibenzochromans and/or chromans of the following formulae:

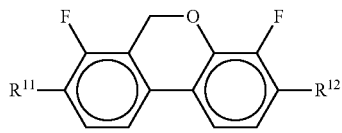

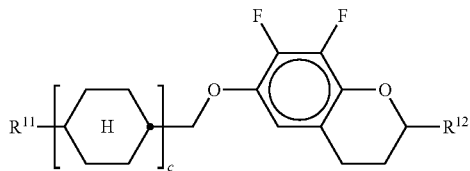

in which $R^{11}$ and $R^{12}$ each, independently of one another, have the meaning indicated above, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

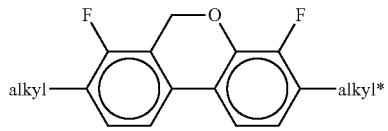

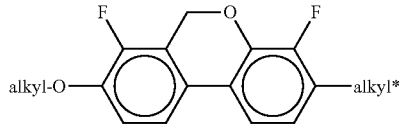

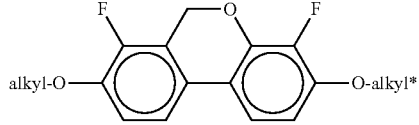

-continued

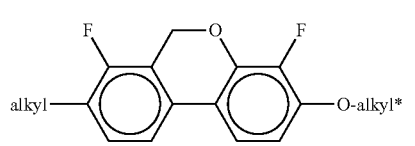
BC4

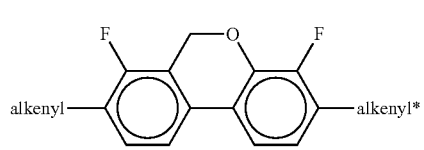
BC5

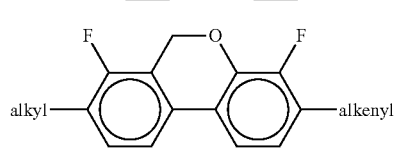
BC6

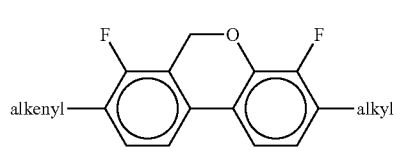
BC7

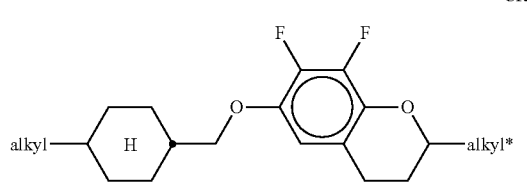
CR1

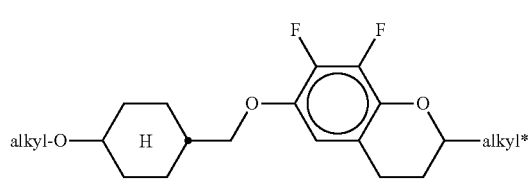
CR2

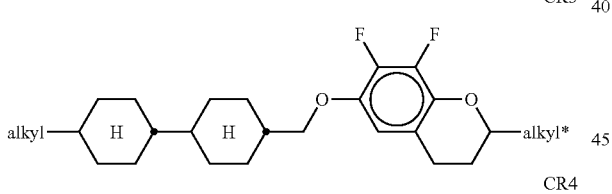
CR3

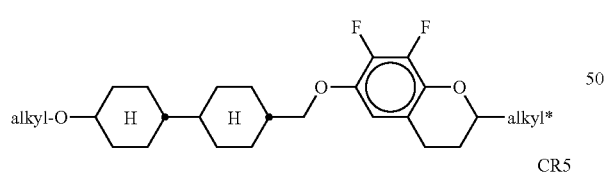
CR4

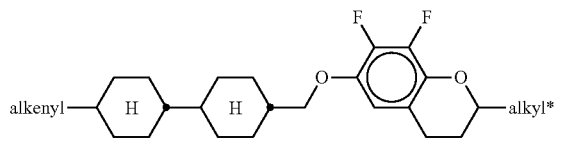
CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to mixtures comprising one, two or three compounds of the formula BC2.

p) LC medium which additionally comprises one or more fluorinated phenanthrenes and/or dibenzofurans of the following formulae:

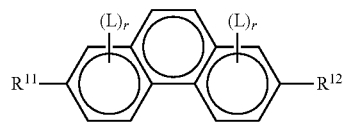
PH

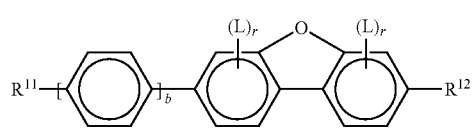
BF in which $R^{11}$ and $R^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

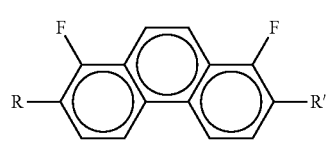
PH1

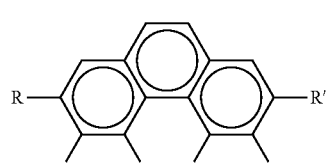
PH2

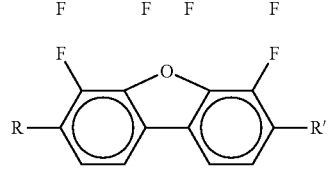
BF1

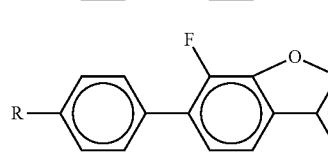
BF2 in which R and R' each, independently of one another, denote a straight-chain alkyl or alkoxy radical having 1-7 C atoms.

q) LC medium, preferably for use in PSA-OCB displays, which comprises one or more compounds selected from the group consisting of the following formulae:

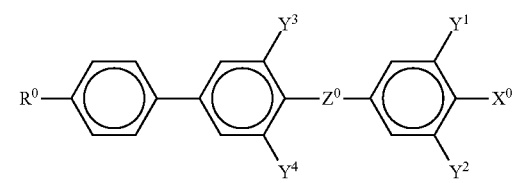

AA

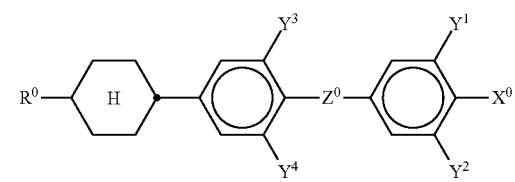

BB

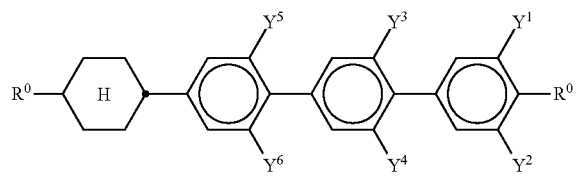

CC in which
- $R^0$ on each occurrence, identically or differently, denotes n-alkyl, alkoxy, oxaalkyl, fluoroalkyl or alkenyl, each having up to 9 C atoms,
- $X^0$ denotes F, Cl or in each case halogenated alkyl, alkenyl, alkenyloxy or alkoxy, each having up to 6 C atoms,
- $Z^0$ denotes —$CF_2O$— or a single bond,
- $Y^{1-6}$ each, independently of one another, denote H or F.
- $X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, particularly preferably F or $OCF_3$.

The compounds of the formula AA are preferably selected from the group consisting of the following formulae:

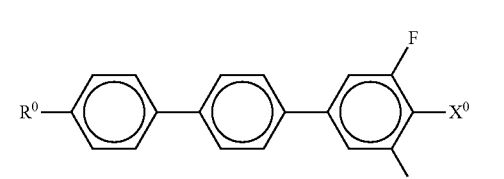

AA1

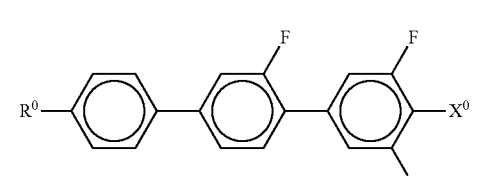

AA2

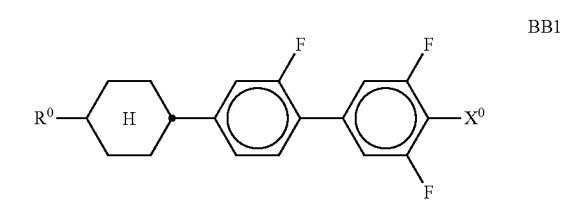

AA3

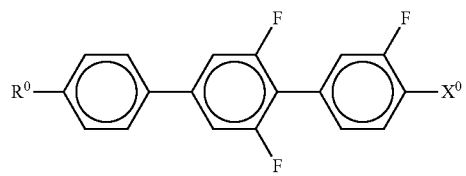

AA4

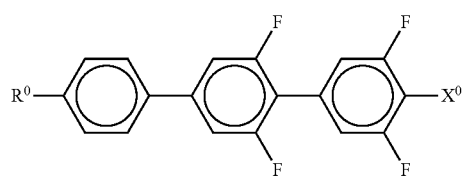

AA5

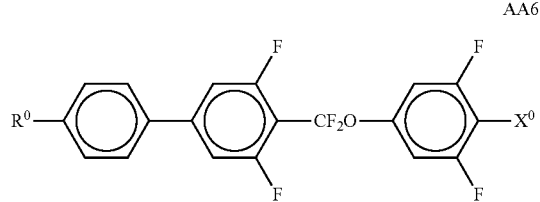

AA6

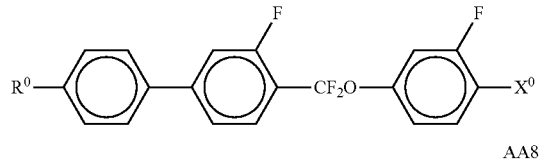

AA7

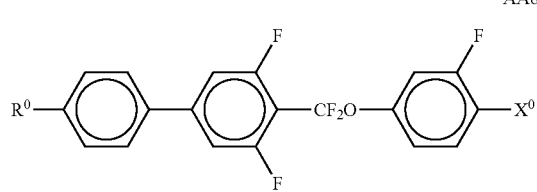

AA8

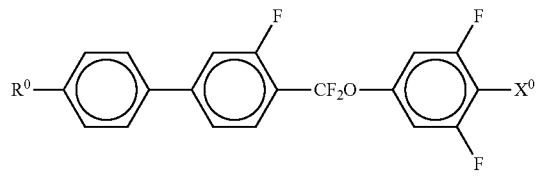

AA9 in which $R^0$ and $X^0$ have the meaning indicated above, and $X^0$ preferably denotes F. Particular preference is given to compounds of the formulae AA2 and AA6.

The compounds of the formula BB are preferably selected from the group consisting of the following formulae:

BB1

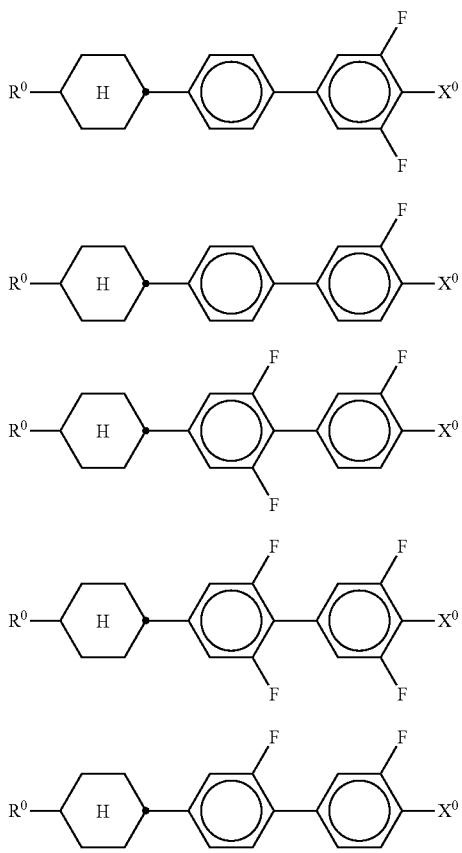

in which R⁰ and X⁰ have the meaning indicated above, and X⁰ preferably denotes F. Particular preference is given to compounds of the formulae BB1, BB2 and BB5.

The compounds of the formula CC are preferably selected from the following formula:

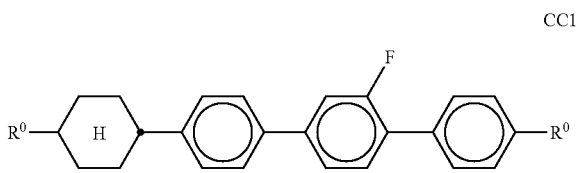

in which R⁰ on each occurrence, identically or differently, has the meaning indicated above and preferably denotes alkyl having 1 to 6 C atoms.

r) LC medium which, apart from the polymerisable compounds of the formula I or sub-formulae thereof and the comonomers, comprises no compounds which contain a terminal vinyloxy group (—O—CH=CH₂).
s) LC medium which comprises 1 to 5, preferably 1, 2 or 3, polymerisable compounds.
t) LC medium in which the proportion of polymerisable compounds in the mixture as a whole is 0.05 to 5%, preferably 0.1 to 1%.
u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.
v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.
w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.
x) LC medium in which the proportion of compounds of the formulae CY, PY and ZK in the mixture as a whole is greater than 70%, preferably greater than 80%.
y) PSA-VA display in which the pretilt angle is preferably ≤85°, particularly preferably ≤80°.

The combination of compounds of the preferred embodiments a)-y) indicated above with the polymerised compounds described above effects low threshold voltages, low rotational viscosities and very good low-temperature stabilities in the LC media according to the invention at the same time as constantly high clearing points and high HR values and allows a particularly low pretilt angle to be established quickly in PSA displays. In particular, the LC media in PSA displays exhibit significantly shortened response times, in particular also the grey-shade response times, compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy $\Delta\epsilon$, preferably of about −0.5 to −10, in particular about −2.5 to −7.5, at 20° C. and 1 kHz.

In the VA-type displays according to the invention, the molecules in the layer of the LC medium in the switched-off state are aligned perpendicular to the electrode surfaces (homeotropically aligned) or have a tilted homeotropic alignment. On application of an electrical voltage to the electrodes, a realignment of the LC molecules with the longitudinal molecular axes parallel to the electrode surfaces takes place.

In the OCB-type displays according to the invention, the molecules in the layer of the LC medium are in a "bend" alignment. On application of an electrical voltage, a realignment of the LC molecules with the longitudinal molecular axes perpendicular to the electrode surfaces takes place.

LC media according to the invention for use in displays of the OCB type have a positive dielectric anisotropy $\Delta\epsilon$, preferably of about +7 to +17 at 20° C. and 1 kHz.

The birefringence Δn in LC media according to the invention for use in displays of the VA type is preferably below 0.16, particularly preferably between 0.06 and 0.14, in particular between 0.07 and 0.12.

The birefringence Δn in LC media according to the invention for use in displays of the OCB type is preferably between 0.14 and 0.22, in particular between 0.16 and 0.22.

The LC media according to the invention may also comprise further additives known to the person skilled in the art and described in the literature, such as, for example, polymerisation initiators, inhibitors, stabilisers, surface-active substances or chiral dopants. These may be polymerisable or unpolymerisable. Polymerisable additives are accordingly classed in the polymerisable component or component A).

Unpolymerisable additives are accordingly classed in the unpolymerisable component or component B).

The LC media may comprise, for example, one or more chiral dopants, preferably those selected from the group consisting of compounds from Table B below.

Furthermore, 0 to 15% by weight, preferably 0 to 10% by weight, of one or more additives selected from the group comprising pleochroic dyes, nanoparticles, conductive salts, complex salts and substances for modifying the dielectric anisotropy, the viscosity and/or the alignment of the nematic phases may be added to the LC media. Suitable and preferred conductive salts are, for example, ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258, 1973). Substances of this type are described, for example, in DE-A-22 09 127, DE-A-22 40 864, DE-A-23 21 632, DE-A-23 38 281, DE-A-24 50 088, DE-A-26 37 430 and DE-A-28 53 728.

The individual components of the preferred embodiments a)-y) of the LC media according to the invention are either known or their preparation processes can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in the smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the usual geometry for PSA displays, as described in the prior art cited at the outset. Geometries without protrusions are preferred, in particular those in which, in addition, the electrode is unstructured on the colour filter side, and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate what properties and property combinations are accessible.

The following abbreviations are used:
(m, m, z: in each case, independently of one another, 1, 2, 3, 4, 5 or 6)

TABLE A

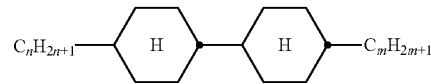

CCH-nm

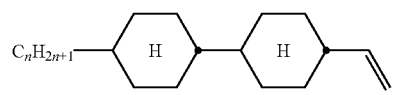

CC-n-V

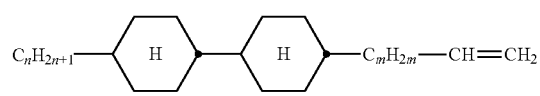

CC-n-mV

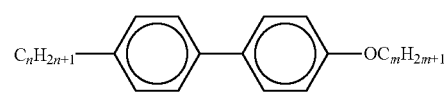

PP-n-Om

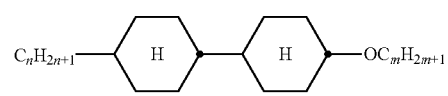

CCH-nOm

TABLE A-continued
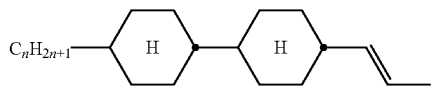
CC-n-V1
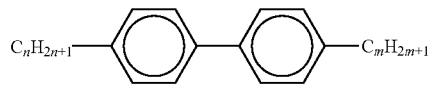
PP-n-m
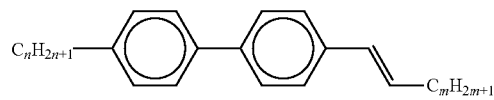
PP-n-Vm
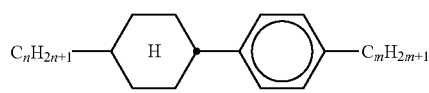
PCH-nm
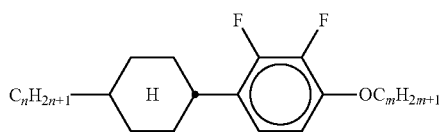
CY-n-Om
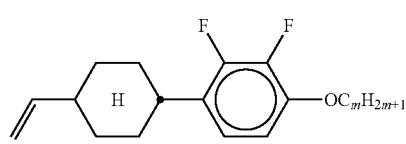
CY-V-Om
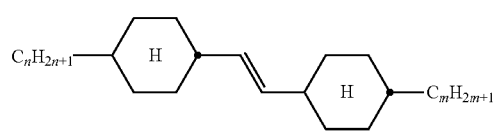
CVC-n-m
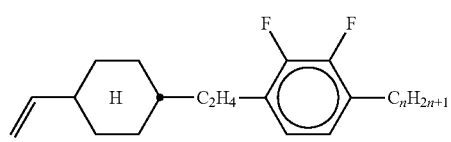
CEY-V-m
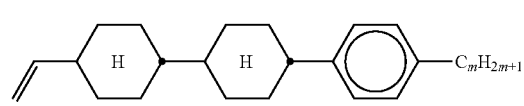
CCP-V-m
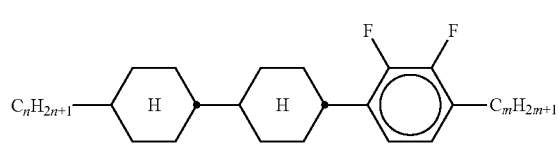
CCY-n-m TABLE A-continued
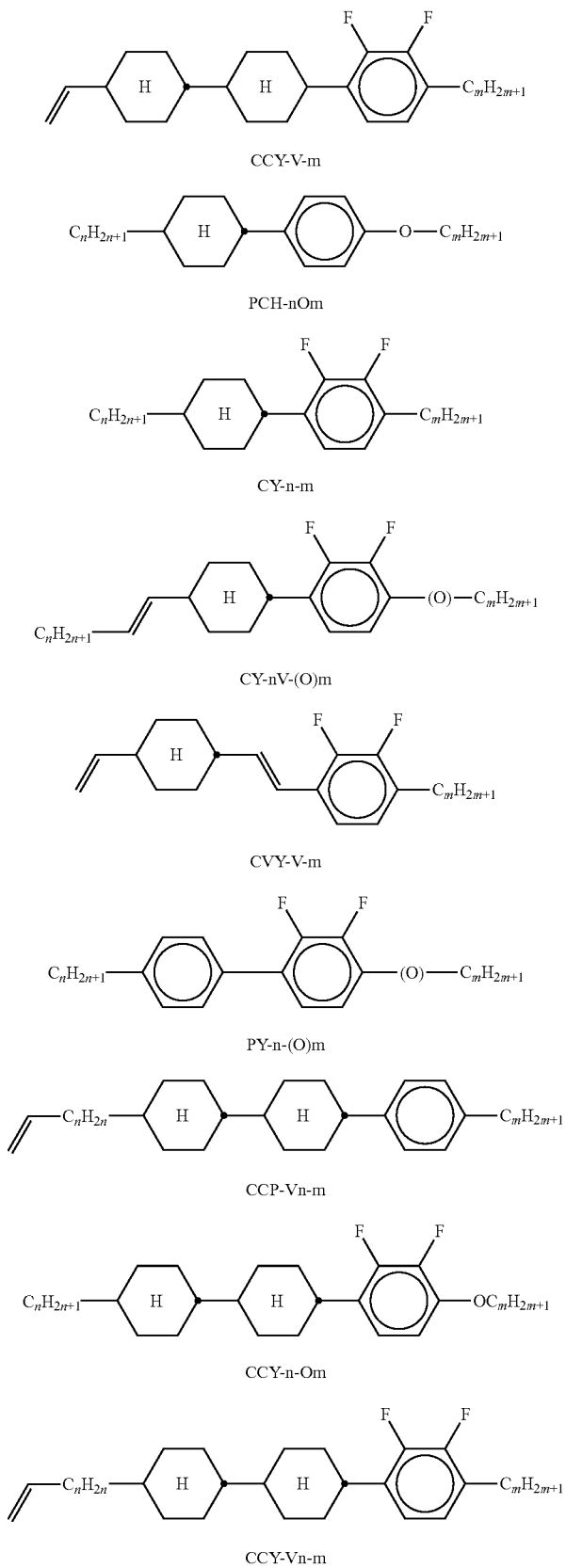

TABLE A-continued
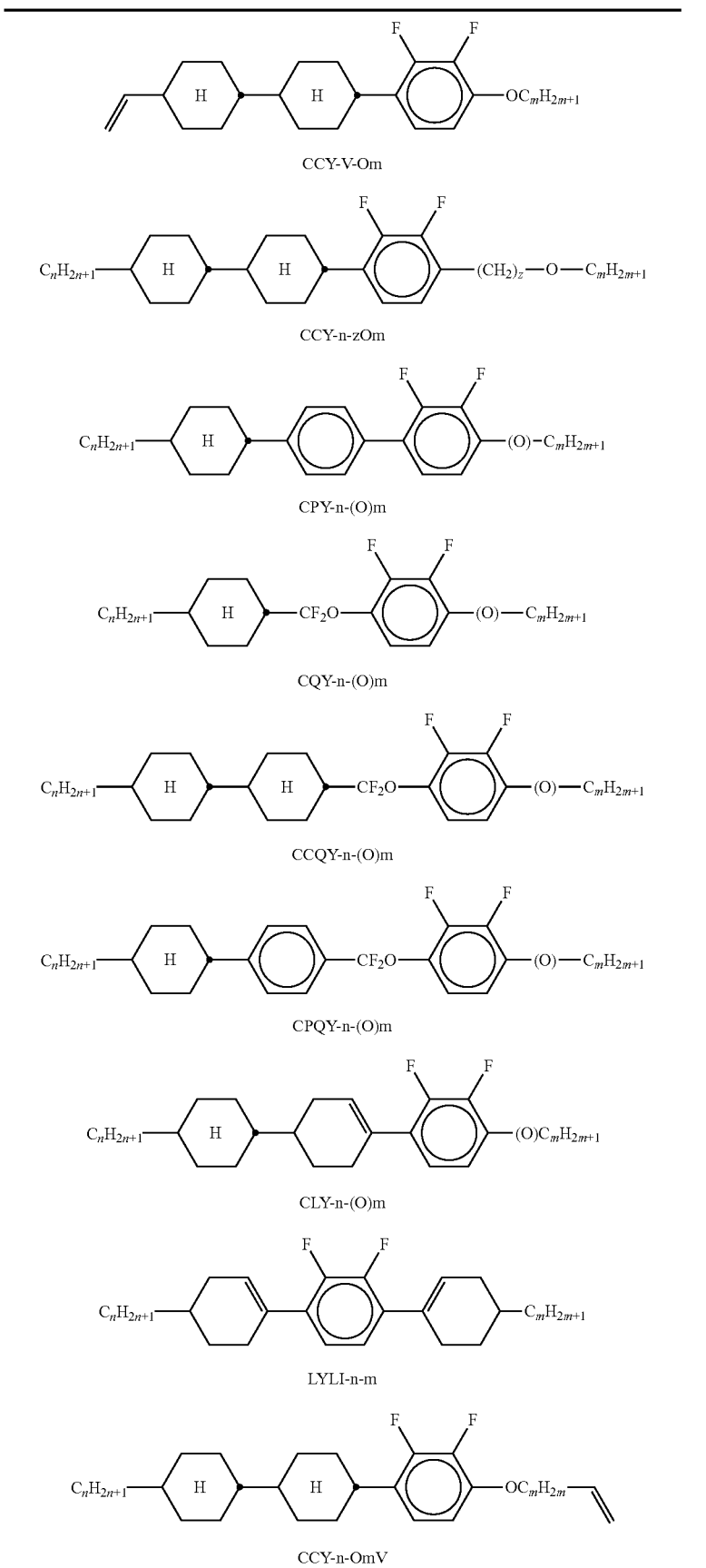

TABLE A-continued
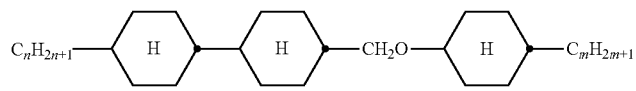
CCOC-n-m
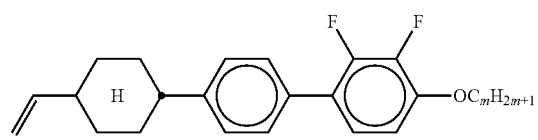
CPY-V-Om
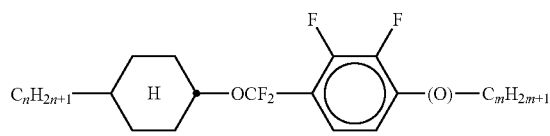
CQIY-n-(O)m
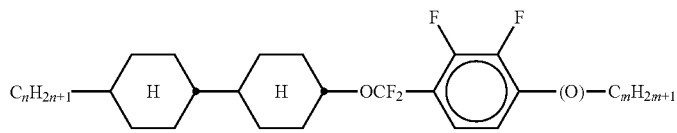
CCQIY-n-(O)m
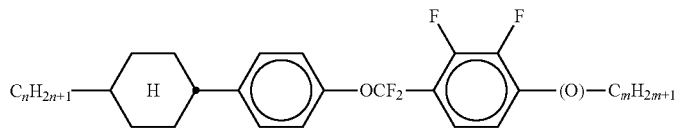
CPQIY-n-Om
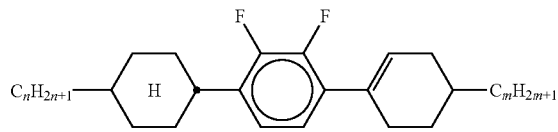
CYLI-n-m
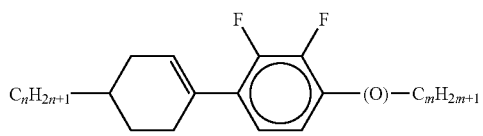
LY-n-(O)m
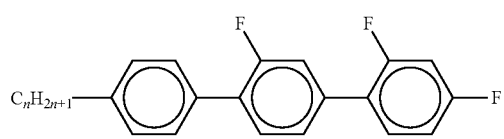
PGIGI-n-F
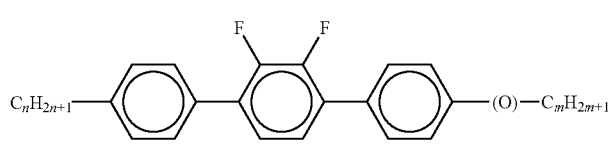
PYP-n-(O)m TABLE A-continued
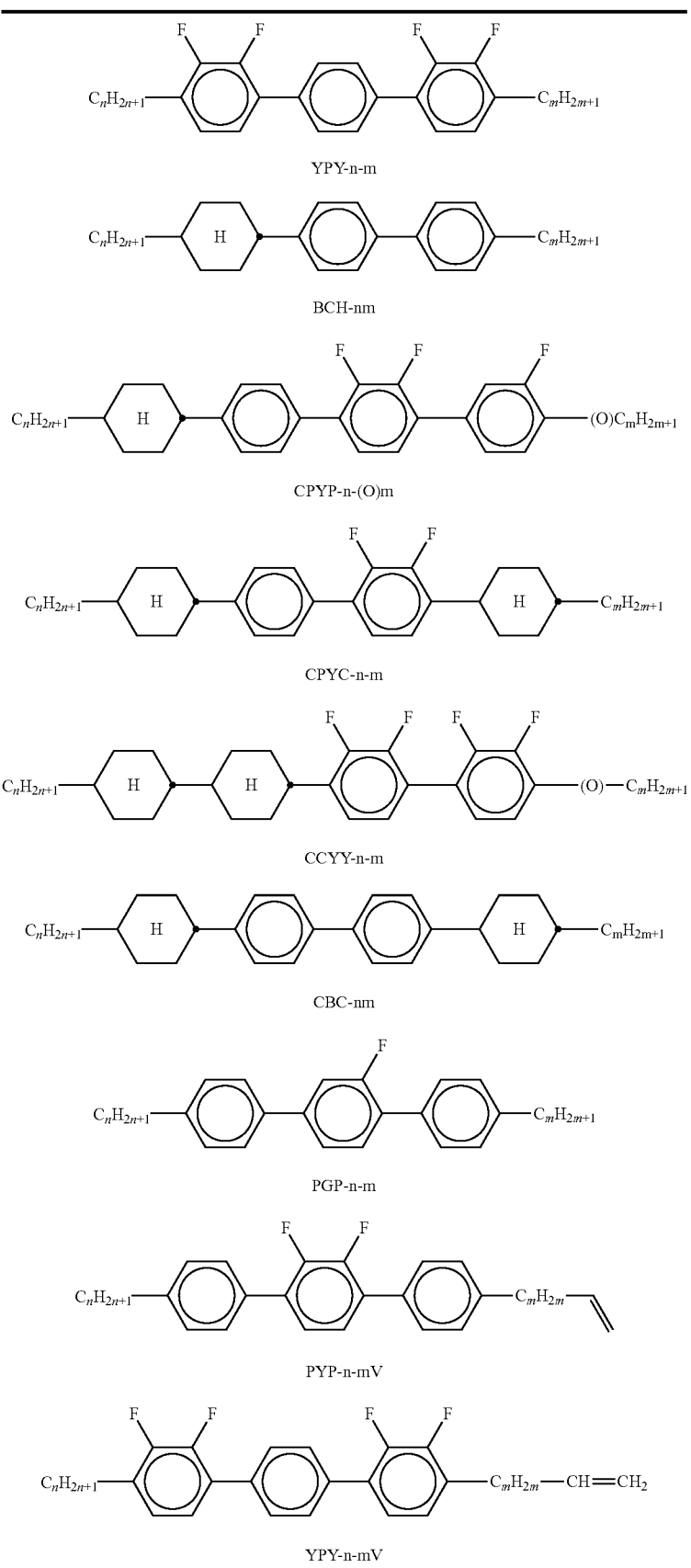

TABLE A-continued
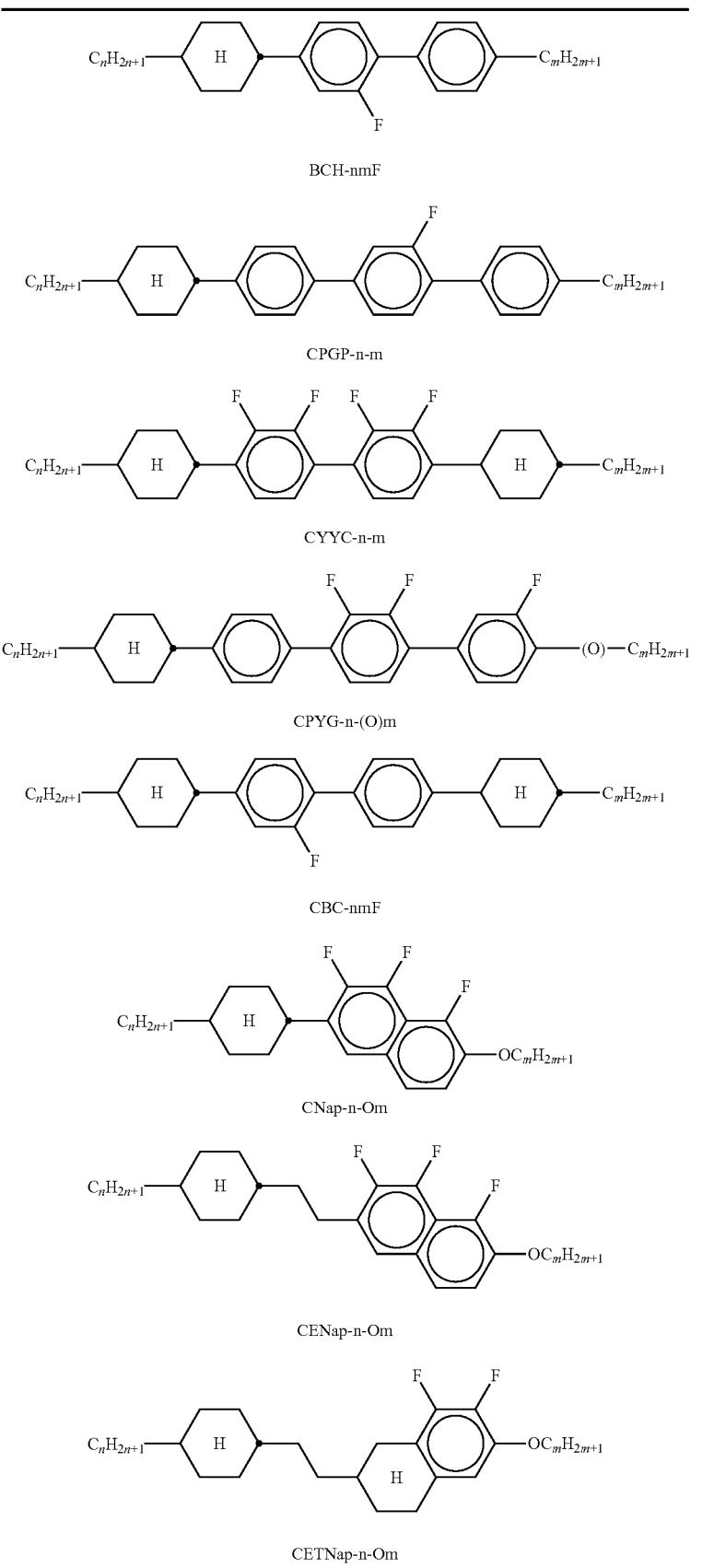
BCH-nmF
CPGP-n-m
CYYC-n-m
CPYG-n-(O)m
CBC-nmF
CNap-n-Om
CENap-n-Om
CETNap-n-Om TABLE A-continued
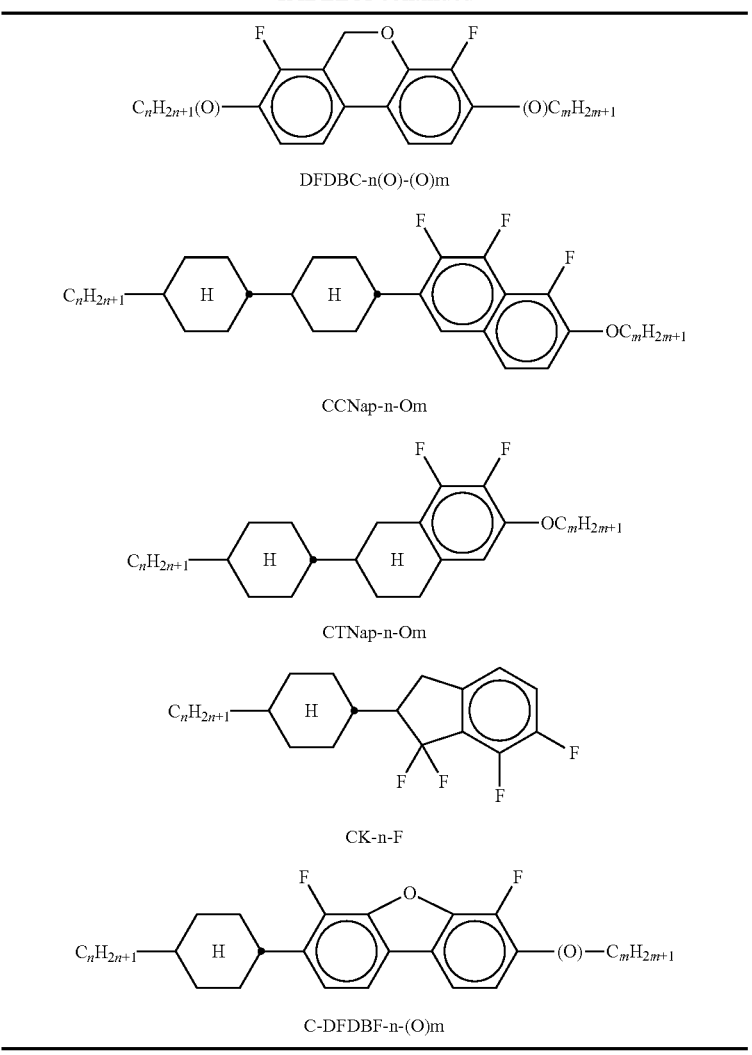
In a preferred embodiment of the present invention, the LC media according to the invention comprise one or more compounds selected from the group consisting of compounds from Table A.
TABLE B
Table B indicates possible chiral dopants which can be added to the LC media according to the invention.
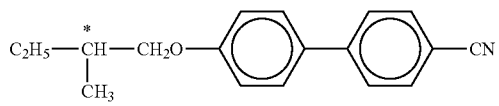
C 15
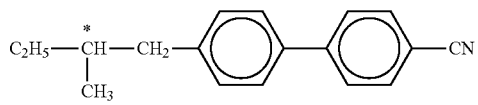
CB 15

TABLE B-continued
Table B indicates possible chiral dopants which can be added to the LC media according to the invention.
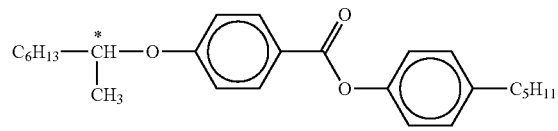
CM 21
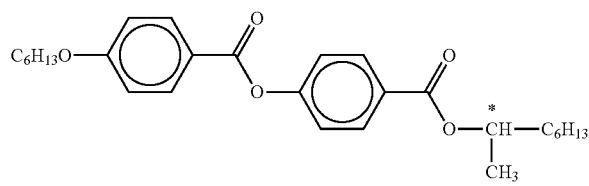
R/S-811
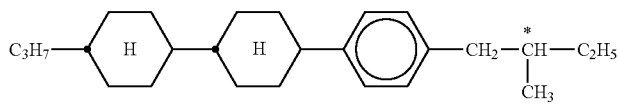
CM 44
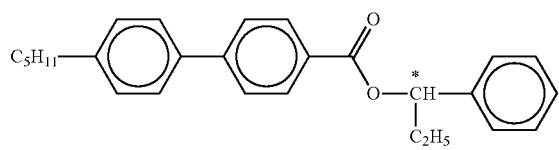
CM 45
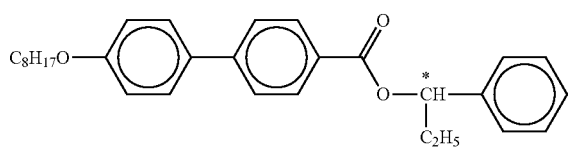
CM 47
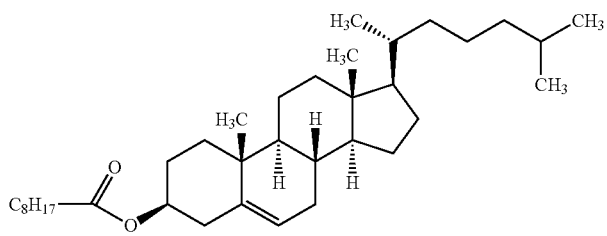
CN
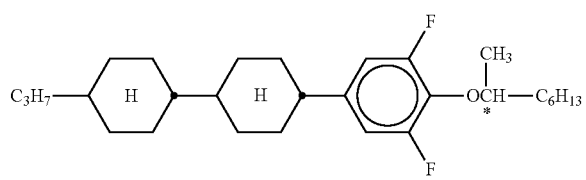
R/S-2011

TABLE B-continued
Table B indicates possible chiral dopants which can be added to the LC media according to the invention.
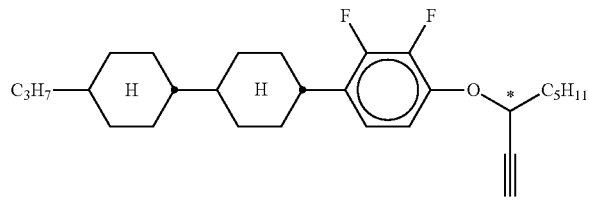
R/S-3011
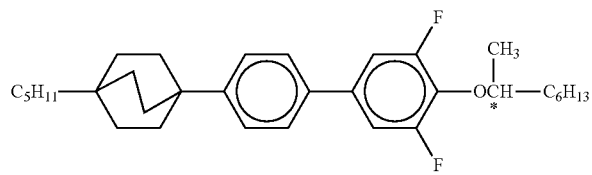
R/S-4011
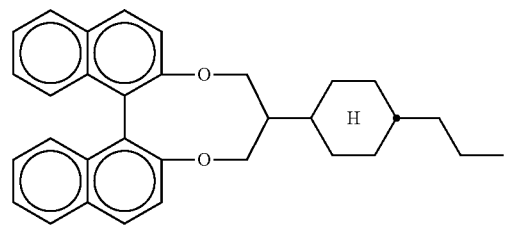
R/S-5011
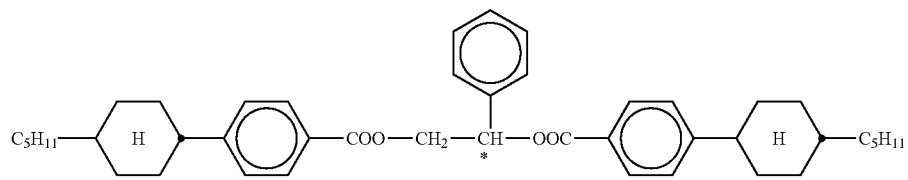
R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

TABLE C

Table C indicates possible stabilisers which can be added to the LC media according to the invention. (n here denotes an integer from 1 to 12).

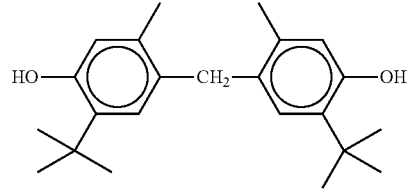

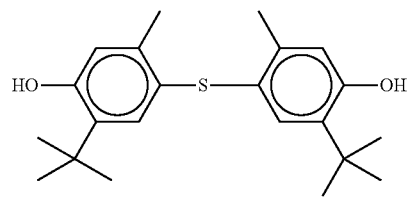

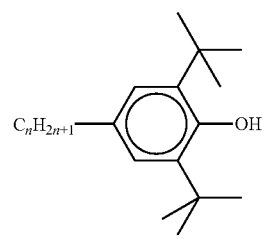

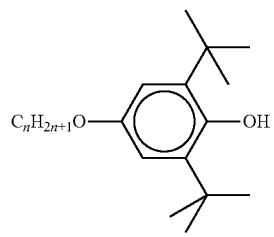

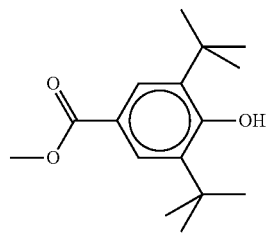

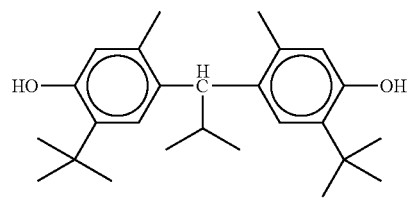

TABLE C-continued
Table C indicates possible stabilisers which can be added to the LC media according to the invention. (n here denotes an integer from 1 to 12).
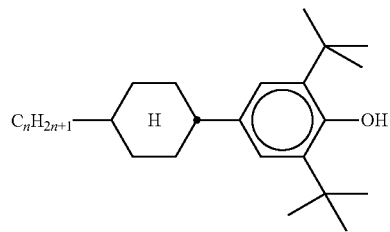
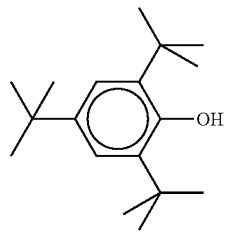
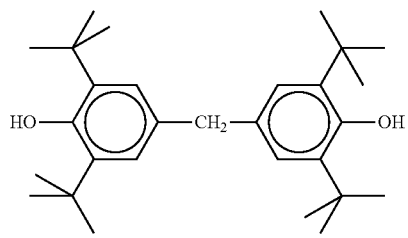
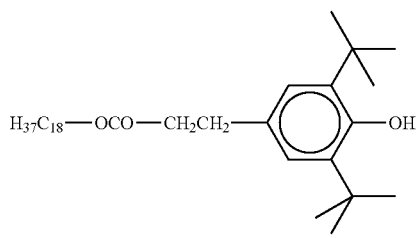
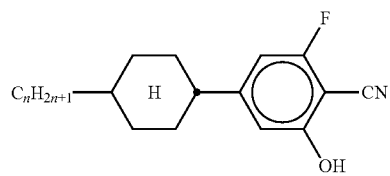
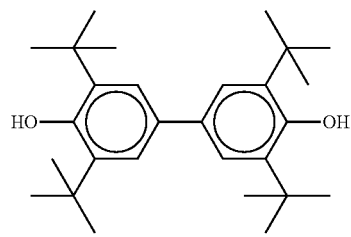

TABLE C-continued
Table C indicates possible stabilisers which can be added to the LC media according to the invention. (n here denotes an integer from 1 to 12).
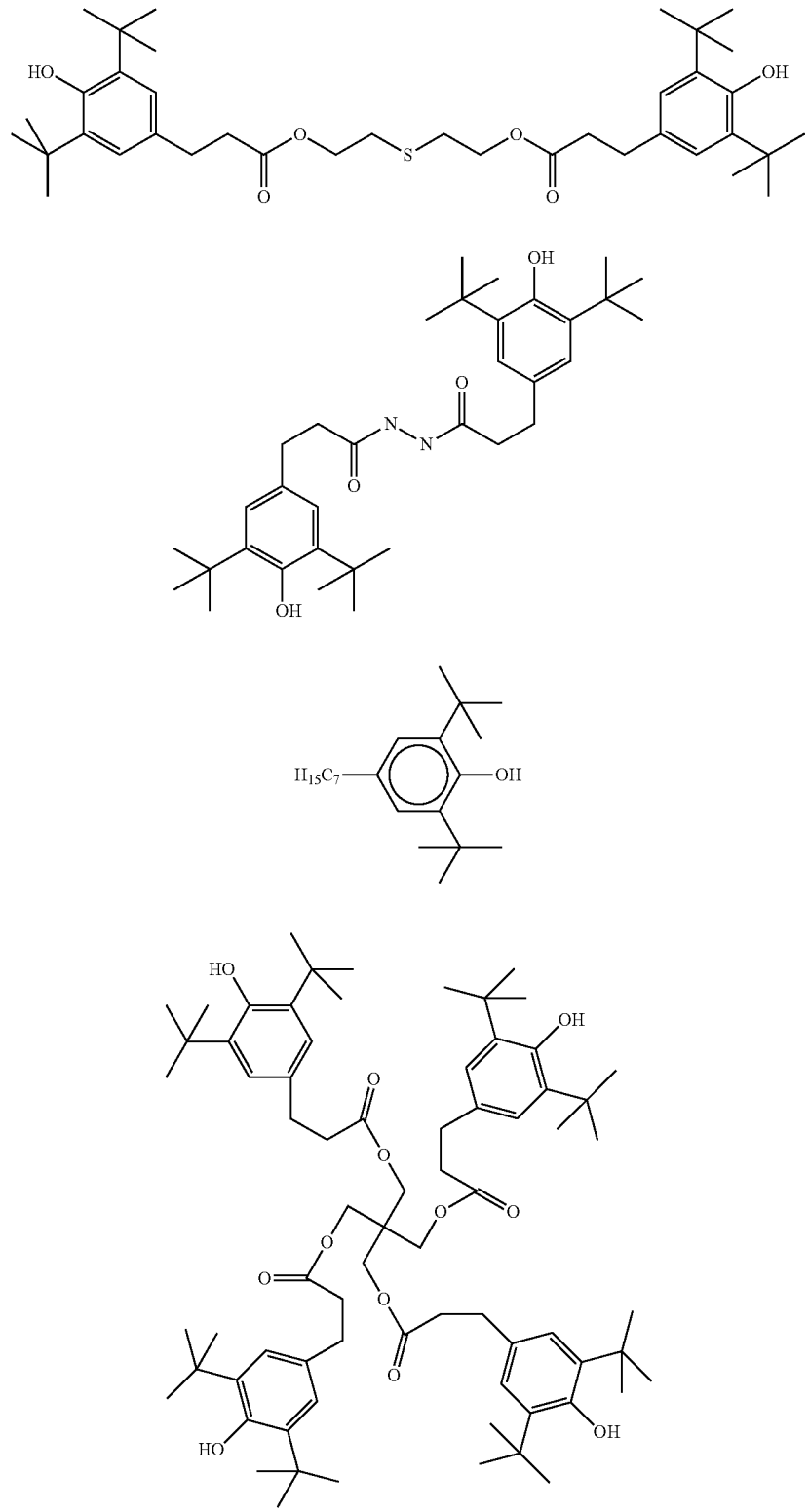

TABLE C-continued
Table C indicates possible stabilisers which can be added to the LC media according to the invention. (n here denotes an integer from 1 to 12).
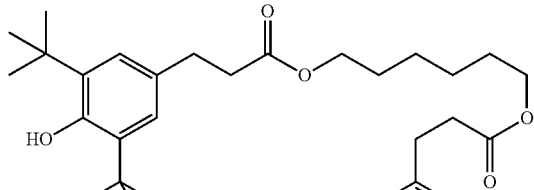
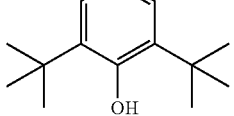
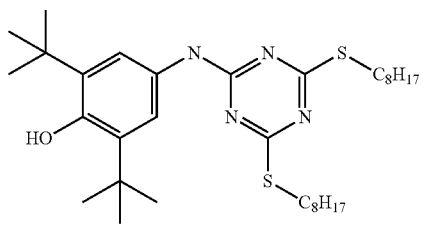
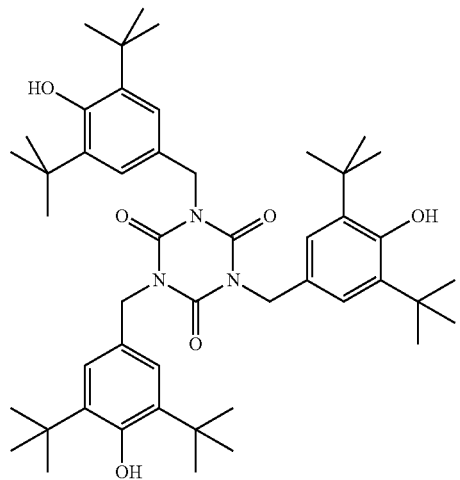 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
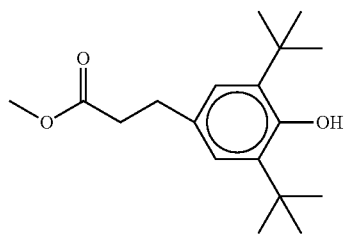
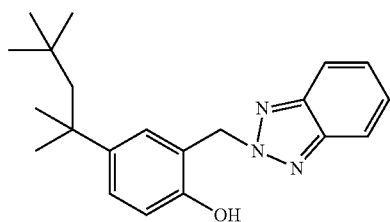 [SMILES: CC(C)(C)CC(C)(C)c1ccc(O)c(Cn2nc3ccccc3n2)c1]

TABLE C-continued
Table C indicates possible stabilisers which can be added to the LC media according to the invention. (n here denotes an integer from 1 to 12).
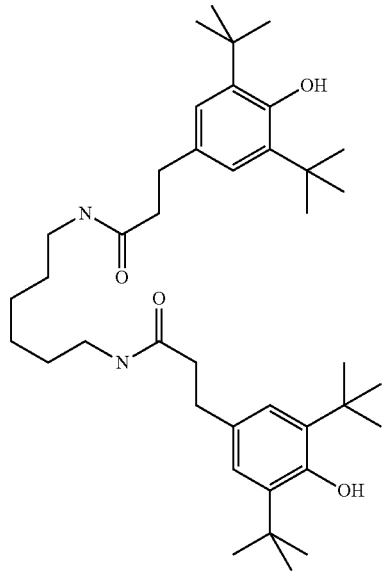 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
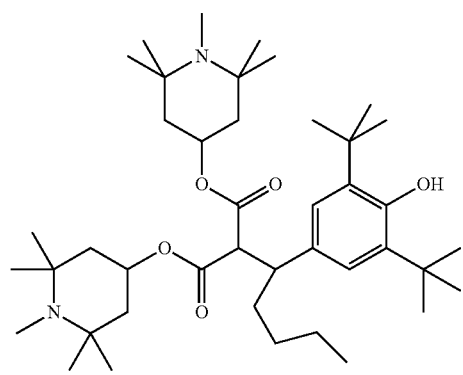 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
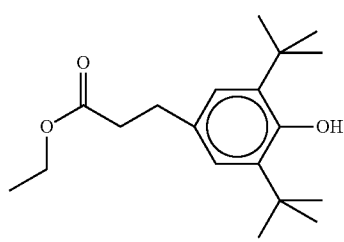
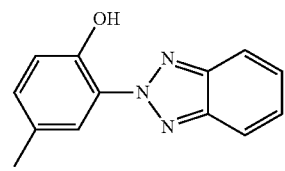 [SMILES: Cc1ccc(O)c(-n2nc3ccccc3n2)c1]

TABLE C-continued
Table C indicates possible stabilisers which can be added to the LC media according to the invention. (n here denotes an integer from 1 to 12).
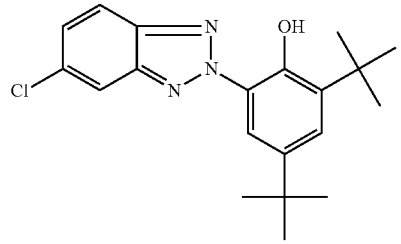 [SMILES: CC(C)(C)c1cc(-n2nc3ccc(Cl)cc3n2)c(O)c(C(C)(C)C)c1]
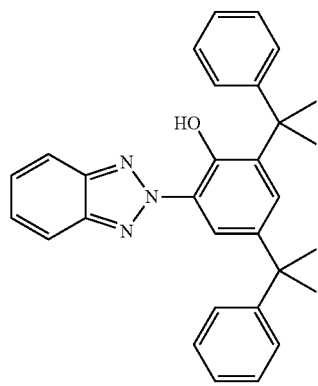 [SMILES: CC(C)(c1ccccc1)c1cc(-n2nc3ccccc3n2)c(O)c(C(C)(C)c2ccccc2)c1]
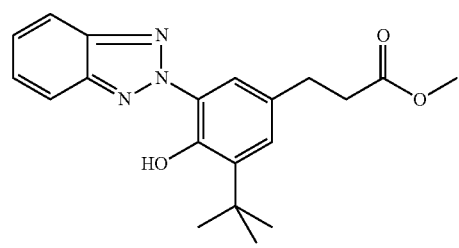 [SMILES: COC(=O)CCc1cc(-n2nc3ccccc3n2)c(O)c(C(C)(C)C)c1]
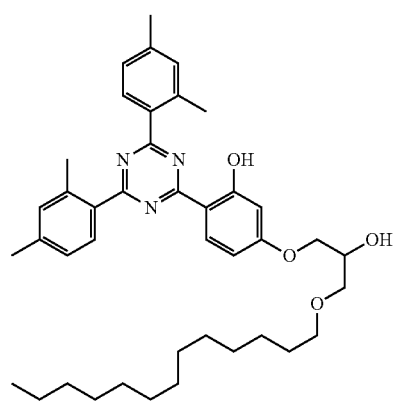 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
Table C indicates possible stabilisers which can be added to the LC media according to the invention. (n here denotes an integer from 1 to 12).
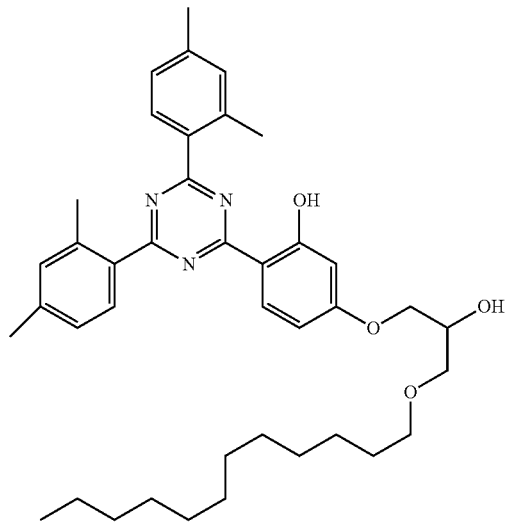 [SMILES: CCCCCCCCCCCCOCC(O)COc1ccc(-c2nc(-c3ccc(C)cc3C)nc(-c3ccc(C)cc3C)n2)c(O)c1]
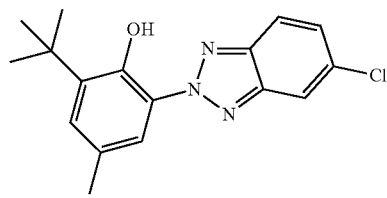 [SMILES: Cc1cc(-n2nc3ccc(Cl)cc3n2)c(O)c(C(C)(C)C)c1]
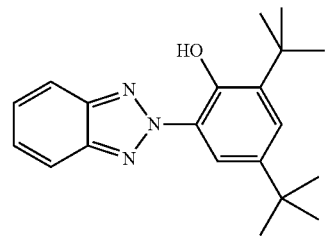 [SMILES: CC(C)(C)c1cc(-n2nc3ccccc3n2)c(O)c(C(C)(C)C)c1]
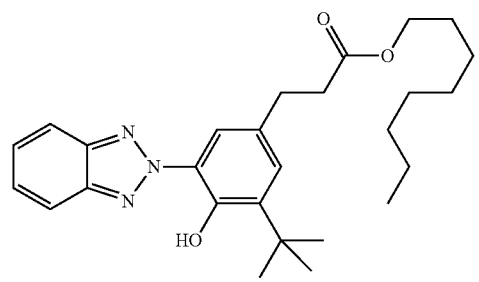 [SMILES: CCCCCCCCOC(=O)CCc1cc(-n2nc3ccccc3n2)c(O)c(C(C)(C)C)c1]

TABLE C-continued

Table C indicates possible stabilisers which can be added to the LC media according to the invention. (n here denotes an integer from 1 to 12).

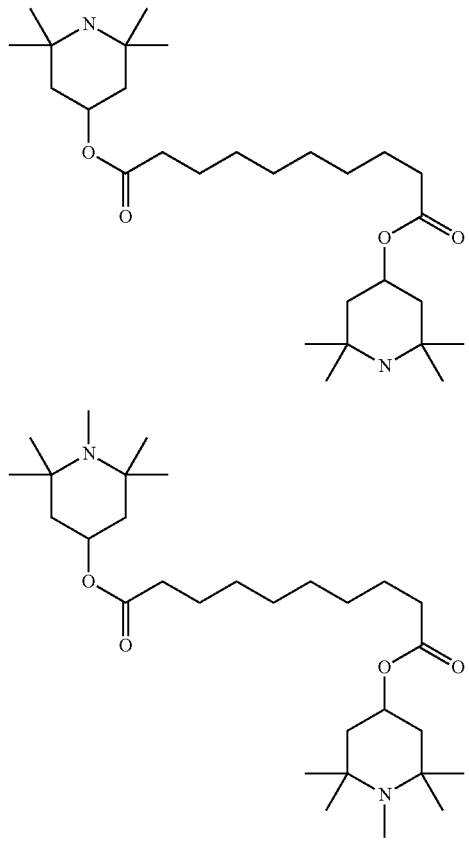

The LC media preferably comprise 0 to 10% by weight, in particular 1 ppm to 5% by weight and particularly preferably 1 ppm to 1% by weight, of stabilisers. The LC media preferably comprise one or more stabilisers selected from the group consisting of compounds from Table C.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric susceptibility perpendicular to the director at 20° C. and 1 kHz,
$\epsilon_\parallel$ dielectric susceptibility parallel to the director at 20° C. and 1 kHz,
$\Delta\epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%], and
$HR_{100}$ voltage holding ratio at 100° C. [%].

Unless explicitly noted otherwise, all concentrations in the present application are indicated in percent by weight and relate to the corresponding mixture as a whole comprising all solid or liquid-crystalline components, without solvent.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

The term "threshold voltage" for the present invention relates to the capacitive threshold ($V_0$), also called the Freedericks threshold, unless explicitly indicated otherwise. In the examples, as generally usual, the optical threshold for 10% relative contrast ($V_{10}$) may also be indicated.

The display used for measurement of the capacitive threshold voltage consists of two plane-parallel glass outer plates at a separation of 20 µm, each of which has, on the insides, an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 µm, each of which has, on the inside, an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell in a pre-specified time by irradiation with UV light, with a voltage simultaneously being applied to the display (usually 10 V to 30 V alternating current, 1 kHz). In the examples, unless indicated otherwise, a 28 mW/cm² mercury vapour lamp is used, and the intensity is measured using a standard UV meter (Ushio UNI meter) fitted with a 365 nm band-pass filter.

The tilt angle is determined by rotational crystal experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into TN-VHR test cells (rubbed at 90°, TN-polyimide alignment layer, layer thickness d≈4 μm). The HR value is determined after 5 min at 100° C. before and after UV exposure for 2 h (sun test) at 1 V, 60 Hz, 64 μs pulse (measuring instrument: Autronic-Melchers VHRM-105).

EXAMPLE 1

The nematic LC host mixture N1 is formulated as follows:

| | | | |
|---|---|---|---|
| CY-3-O4 | 14.00% | Cl.p. | +70.0 |
| CY-5-O4 | 13.00% | Δn | 0.0825 |
| CCY-3-O2 | 8.00% | Δε | −3.5 |
| CCY-5-O2 | 8.00% | ε∥ | 3.5 |
| CCY-2-1 | 9.00% | $K_3/K_1$ | 1.00 |
| CCY-3-1 | 9.00% | $\gamma_1$ | 141 |
| CPY-2-O2 | 8.00% | $V_0$ | 2.06 |
| CCH-501 | 9.00% | | |
| CCH-35 | 14.00% | | |
| PCH-53 | 8.00% | | |

0.3% of RM 1 according to the invention (phenanthryl 2,7-dimethacrylate) is added to the LC mixture N1:

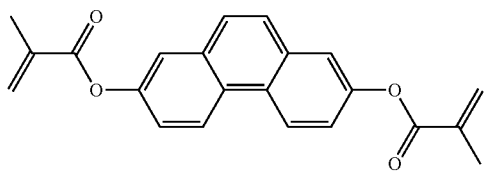

1

The resultant mixture is introduced into VA e/o test cells as described above.

For comparative purposes, VA e/o test cells as described above are produced, but instead of RM 1 according to the invention, the RM of the formula A or B known from the prior art is used:

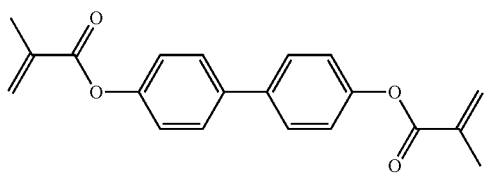

A

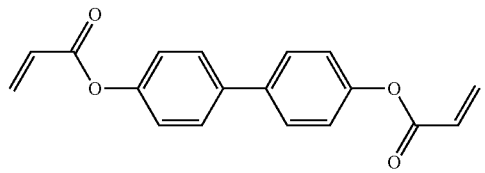

B

For each RM/host mixture combination, two test cells are produced. The cells are irradiated with UV light (365 nm) having an intensity of 50 mW/cm² for various durations with application of a voltage of 24 V (alternating current), causing polymerisation of the RM.

For each test cell, the pretilt angle is determined as indicated above. The pretilt angle achieved for each of the various exposure times is shown in Table 1. The pretilt angles for the two cells in each test series and the average pretilt angle calculated therefrom are indicated therein:

TABLE 1

| Expo-sure time [s] | Tilt [°] for 0.3% of RM 1 in N1 | | | Tilt [°] for 0.3% of RM A in N1 | | | Tilt [°] for 0.3% of RM B in N1 | | |
|---|---|---|---|---|---|---|---|---|---|
| | Cell 1 | Cell 2 | Average | Cell 1 | Cell 2 | Average | Cell 1 | Cell 2 | Average |
| 0 | 89.2 | 89.2 | 89.2 | 89.1 | 89.3 | 89.2 | 89.5 | 89.5 | 89.5 |
| 15 | 88.5 | 89.0 | 88.8 | 89.1 | 88.8 | 89.0 | 89.3 | 89.2 | 89.3 |
| 30 | 89.0 | 87.6 | 88.3 | 88.8 | 88.9 | 88.9 | 88.8 | 89.3 | 89.1 |
| 45 | 85.0 | 85.0 | 85.0 | 89.0 | 88.1 | 88.6 | 88.4 | 87.8 | 88.1 |
| 60 | 80.8 | 80.5 | 80.7 | 88.5 | 88.5 | 88.5 | 88.2 | 88.5 | 88.4 |
| 90 | 72.1 | 72.1 | 72.1 | 85.5 | 85.5 | 85.5 | 87.1 | 87.4 | 87.3 |
| 120 | 67.8 | 66.3 | 67.1 | 80.3 | 81.3 | 80.8 | 86.2 | 86.5 | 86.4 |

As can be seen from Table 1, a significantly lower pretilt angle can be achieved with the LC medium according to the invention comprising RM 1 than with the LC media comprising RM A or B from the prior art. The average pretilt angle for the LC medium according to the invention after an exposure time of 2 min is 67.1°, i.e. the average pretilt angle change (i.e. compared with 90° initial alignment) is 22.9°, which is more than six times the corresponding value achieved with the LC medium comprising RM B (3.6°).

Table 1 also shows that, in contrast to the LC media comprising RM A or B, a low pretilt angle can already be achieved after a significantly shorter exposure time with the LC medium according to the invention. For example, the LC medium according to the invention exhibits an average pretilt angle of 85.0° after an exposure time of only 45 s, while a similar value (85.5°) is only achieved after 90 s for the LC medium comprising RM A, i.e. after twice the exposure time.

EXAMPLE 2

Nematic LC host mixture N2 is formulated as follows:

| | | | |
|---|---|---|---|
| CY-3-O2 | 16.00% | Cl.p. | +71.0 |
| CY-5-O2 | 14.00% | Δn | 0.0822 |
| CCY-3-O2 | 12.00% | Δε | −3.8 |
| CCY-5-O2 | 11.00% | ε∥ | 3.6 |
| CCY-2-1 | 9.00% | $K_3/K_1$ | 1.16 |
| CCY-3-1 | 8.00% | $\gamma_1$ | 133 |
| CCH-34 | 8.00% | $V_0$ | 2.10 |
| CCH-35 | 9.00% | | |
| PCH-53 | 7.00% | | |
| PCH-301 | 6.00% | | |

Test cells are produced in each case as described in Example 1 from LC host mixture N2 and RM 1 according to the invention or RM A or B, polymerised by UV irradiation with application of a voltage, and the pretilt angle is determined after various exposure times. The results are shown in Table 2.

TABLE 2

| Expo- sure time [s] | Tilt [°] for 0.3% of RM 1 in N2 | | | Tilt [°] for 0.3% of RM A in N2 | | | Tilt [°] for 0.3% of RM B in N2 | | |
|---|---|---|---|---|---|---|---|---|---|
| | Cell 1 | Cell 2 | Average | Cell 1 | Cell 2 | Average | Cell 1 | Cell 2 | Average |
| 0 | 89.5 | 89.5 | 89.5 | 89.3 | 89.0 | 89.2 | 89.1 | 89.1 | 89.1 |
| 15 | 89.3 | 88.5 | 88.9 | 89.3 | 89.1 | 89.2 | 89.3 | 88.9 | 89.1 |
| 30 | 86.3 | 85.5 | 85.9 | 88.9 | 89.0 | 89.0 | 89.1 | 88.4 | 88.8 |
| 45 | 84.4 | 83.6 | 84.0 | 88.0 | 88.0 | 88.0 | 88.0 | 88.1 | 88.1 |
| 60 | 80.4 | 80.5 | 80.5 | 87.7 | 88.1 | 87.9 | 87.8 | 87.9 | 87.9 |
| 90 | 77.9 | 76.2 | 77.1 | 85.3 | 86.1 | 85.7 | 86.7 | 86.8 | 86.8 |
| 120 | 75.3 | 74.8 | 75.1 | 83.7 | 81.8 | 82.8 | 86.2 | 85.8 | 86.0 |

As shown in Example 1, the LC medium according to the invention comprising RM 1 already exhibits a significantly lower pretilt angle or a comparable pretilt angle after a significantly shorter exposure time compared with the LC media comprising RM A or B.

EXAMPLE 3

Test cells are produced in each case as described in Example 1 from LC host mixture N1 and RM 1 according to the invention or RM A or B. In a second experiment, 0.006% (based on the mixture as a whole) of the photoinitiator (PI) Irgacure651® is additionally added to the LC medium before the polymerisation. For polymerisation of the RM, the cells are irradiated with UV light (365 nm) having an intensity of 28 mW/cm$^2$ with application of a voltage of 10 V (alternating current), where the exposure time is 20 min for the samples without PI and 2 min for the samples with PI. The pretilt angles achieved are shown in Table 3.

TABLE 3

| | Tilt [°] for 0.3% of RM in N1 | |
|---|---|---|
| RM | without PI, 20 min | with PI, 2 min |
| 1 | 78.8 | 80.6 |
| A | 81.8 | 84.8 |
| B | 86.2 | 87 |

As can be seen from Table 3, the LC medium according to the invention comprising RM 1 exhibits the lowest pretilt angle, both with and without initiator.

EXAMPLE 4

LC media are prepared from LC host mixture N1 or N2 by addition of 0.3% of RM 1 according to the invention or RM A or B and introduced into TN-VHR test cells as described above. The VHR value before and after UV exposure is determined as described above. The results are shown in Table 4.

TABLE 4

| Host mixture | RM | VHR [%] before UV | VHR [%] after UV |
|---|---|---|---|
| N1 | — | 90.2 | 81.9 |
| N1 | 1 | 90.5 | 93.0 |
| N1 | A | 89.7 | 91.6 |
| N1 | B | 89.7 | 85.4 |
| N2 | — | 87.6 | 58.9 |
| N2 | 1 | 87.0 | 84.4 |
| N2 | A | 87.3 | 86.0 |
| N2 | B | 86.3 | 90.4 |

As can be seen from Table 4, the LC media according to the invention comprising RM 1 exhibit comparable, for host mixture N1 even significantly higher, VHR values compared with the LC media from the prior art comprising RM A or B.

EXAMPLE 5

The nematic LC host mixture N3 is formulated as follows:

| CCH-501 | 9.00% | Cl.p. | +70.0 |
|---|---|---|---|
| CCH-35 | 14.00% | Δn | 0.0825 |
| PCH-53 | 8.00% | Δε | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

Test cells are produced analogously to the process described above from LC host mixture N3 and in each case 0.3% of RM 1 according to the invention or of RM A from the prior art, and the RM is polymerised as described in Example 1 by UV irradiation with application of a voltage.

After various exposure times, the residual content of unpolymerised RM in the LC cell is determined in each case. To this end, the test cell is cut open, the mixture is washed out using an organic solvent, and the content of residual RM in the solution is determined by HPLC. This enables the rate and completeness of the polymerisation of the respective RM in the LC cell to be deduced (a lower residual content of unpolymerised RM at the same exposure time means faster and more complete polymerisation). The results are shown in Table 5.

TABLE 5

| Mixture | Exposure time [s] | Residual content of the RM [%] |
|---|---|---|
| N3 + RM 1 | 0 | 0.30 |
| | 120 | 0.09 |
| | 240 | 0.04 |
| | 360 | 0.02 |
| N3 + RM A | 0 | 0.30 |
| | 120 | 0.27 |
| | 240 | 0.23 |
| | 360 | 0.18 |

As can be seen from Table 5, RM 1 exhibits a significantly faster polymerisation rate in an LC cell according to the invention than does RM A from the prior art.

The invention claimed is:

1. A liquid-crystal (LC) medium comprising:
one or more compounds of the formula I

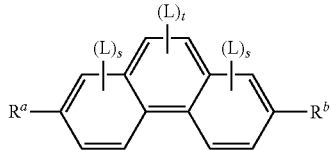

I in which the individual radicals have the following meanings:

$R^a$ and $R^b$ denote P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^{00}$)=C(R$^{000}$)—, —C≡C—, —N(R)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$ and $R^b$ denotes or contains a group P-Sp-, P on each occurrence, identically or differently, denotes a polymerisable group selected from vinyloxy, acrylate, methacrylate, fluoroacrylate, chloroacrylate, oxetane and epoxide groups, Sp on each occurrence, identically or differently, denotes a spacer group or a single bond, $R^{00}$ and $R^{000}$ each, independently of one another, denote H or alkyl having 1 to 12 C atoms, L on each occurrence, identically or differently, denotes an unpolymerisable group selected from F, Cl, —CN and straight-chain or branched alkyl having 1 to 25 carbon atoms, in which, in addition, one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, or —O—CO—O— in such a way that O and/or S atoms are not linked directly to one another, and in which, in addition, one or more H atoms may be replaced by F, Cl, Br, I or CN, s on each occurrence, identically or differently, denotes 0, 1, 2 or 3, and t denotes 0, 1 or 2, provided that one or both of s and t are ≥1, with the proviso that the following compounds are excluded:

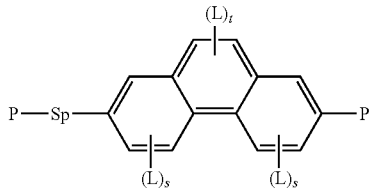

in which Sp denotes a spacer group, and P, L, s and t have the meaning indicated above; and one or more compounds of the following formula:

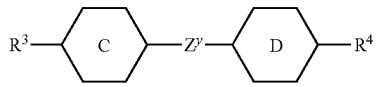

ZK in which the individual radicals have the following meanings:

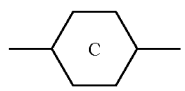

denotes

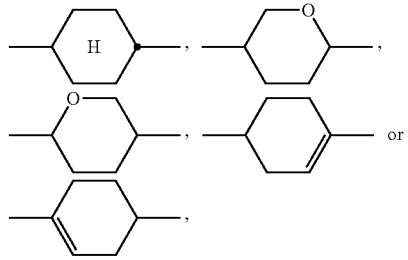

denotes

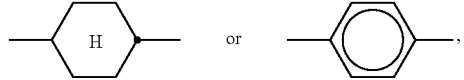

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, and Zy denoted —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

2. An LC display of the PS (polymer-stabilised) or PSA (polymer-sustained alignment) type comprising an LC medium of claim 1.

3. An LC display of claim 2 containing an LC cell consisting of two substrates, where at least one substrate is transparent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, where at least one of the polymerisable compounds is a compound of the formula I.

4. An LC medium according to claim 1, wherein the compounds of the formula I are selected from the group consisting of the following sub-formulae:

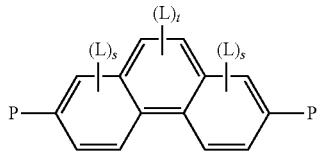

I1

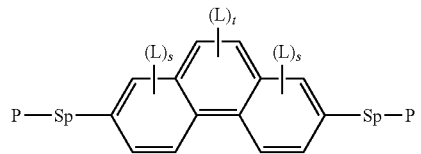

I2 in which P denotes an acrylate or methacrylate group and Sp denotes straight-chain alkyleneoxy having 1, 2, 3, 4, 5 or 6 C atoms.

5. An LC display comprising an LC medium according to claim 1.

6. An LC display according to claim 5, which is a PSA-VA, PSA-OCB, PS-IPS, PS-FFS or PS-TN display.

7. An LC medium according to claim 1, wherein $R^a$ and $R^b$ in formula I denote identical or different radicals P-Sp-.

* * * * *